(12) United States Patent  
Hough

(10) Patent No.: US 7,901,089 B2
(45) Date of Patent: Mar. 8, 2011

(54) OPTICAL SYSTEM WITH ARRAY LIGHT SOURCE

(75) Inventor: Thomas A. Hough, Tuscon, AZ (US)

(73) Assignee: Whiterock Design, LLC, Dallas, TX (US)

(*) Notice: Subject to any disclaimer, the term of this patent is extended or adjusted under 35 U.S.C. 154(b) by 976 days.

(21) Appl. No.: 11/799,098

(22) Filed: Apr. 30, 2007

(65) Prior Publication Data

US 2007/0268700 A1 Nov. 22, 2007

Related U.S. Application Data

(63) Continuation-in-part of application No. 10/992,802, filed on Nov. 19, 2004, now Pat. No. 7,226,188.

(51) Int. Cl.
G03B 21/14 (2006.01)

(52) U.S. Cl. .................................................. 353/97

(58) Field of Classification Search ............ 353/7, 353/15, 20, 29, 69, 121, 97; 362/268, 293, 362/554, 556, 545, 546; 250/205, 552, 553, 250/239; 385/115, 116; 359/637, 638, 649, 359/434
See application file for complete search history.

(56) References Cited

U.S. PATENT DOCUMENTS

| | | | |
|---|---|---|---|
| 3,069,536 A | 12/1962 | Dion et al. | |
| 3,888,462 A * | 6/1975 | Sobotta | ......... 353/29 |
| 3,933,408 A | 1/1976 | Reinert | |
| 4,146,310 A | 3/1979 | Kohayakawa et al. | |
| 4,392,187 A | 7/1983 | Bornhorst | |
| 4,511,223 A | 4/1985 | Hirose | |
| 4,602,321 A | 7/1986 | Bornhorst | |
| 4,745,531 A | 5/1988 | Leclercq | |
| 4,800,474 A | 1/1989 | Bornhorst | |
| 4,811,182 A | 3/1989 | Solomon | |

(Continued)

FOREIGN PATENT DOCUMENTS

DE 197 22 191 A1 12/1998

(Continued)

OTHER PUBLICATIONS

Office Action dated Mar. 11, 2008 in U.S. Appl. No. 11/796,999.

(Continued)

*Primary Examiner*—Georgia Y Epps
*Assistant Examiner*—Don Williams

(57) ABSTRACT

An optical system, projector and method are provided that include a projection gate between a light source array and a projection lens. The projection lens projects an image of the projection gate. A relay lens group between the light source array and the projection gate prevents the projection lens from projecting an image of the light source array. A lamp housing is provided for use with a projector housing. The lamp housing includes a light source array and a relay lens group located between the light source array and a projection gate in the projector housing. An illumination source for optical fibers is provided that includes a relay lens group between a light source and a coupling in a housing. The relay lens group prevents an image of the light source from being formed at input ends of optical fibers positioned in the coupling.

28 Claims, 19 Drawing Sheets

U.S. PATENT DOCUMENTS

| | | | |
|---|---|---|---|
| 4,890,208 A | 12/1989 | Izenour | |
| 4,893,225 A | 1/1990 | Solomon | |
| 4,894,760 A | 1/1990 | Callahan | |
| 4,897,770 A | 1/1990 | Solomon | |
| 4,914,556 A | 4/1990 | Richardson | |
| 4,958,265 A | 9/1990 | Solomon | |
| 4,972,306 A | 11/1990 | Bornhorst | |
| 4,984,143 A | 1/1991 | Richardson | |
| 5,060,126 A | 10/1991 | Tyler et al. | |
| 5,073,847 A | 12/1991 | Bornhorst | |
| 5,126,886 A | 6/1992 | Richardson et al. | |
| 5,186,536 A | 2/1993 | Bornhorst et al. | |
| 5,188,452 A | 2/1993 | Ryan | |
| 5,282,121 A | 1/1994 | Bornhorst et al. | |
| 5,371,655 A | 12/1994 | Murdock et al. | |
| 5,416,681 A | 5/1995 | Wu | |
| 5,426,576 A | 6/1995 | Hewlett | |
| 5,461,692 A * | 10/1995 | Nagel | 385/127 |
| 5,497,234 A | 3/1996 | Haga | |
| 5,499,139 A * | 3/1996 | Chen et al. | 359/649 |
| 5,515,254 A | 5/1996 | Smith et al. | |
| 5,597,223 A | 1/1997 | Watanabe et al. | |
| 5,622,418 A | 4/1997 | Daijogo et al. | |
| 5,622,426 A | 4/1997 | Romano et al. | |
| 5,659,429 A | 8/1997 | Kudo | |
| 5,752,766 A | 5/1998 | Bailey et al. | |
| 5,790,329 A | 8/1998 | Klaus et al. | |
| 5,969,868 A | 10/1999 | Bornhorst et al. | |
| 6,155,698 A | 12/2000 | Yoon et al. | |
| 6,198,576 B1 | 3/2001 | Matsuyama | |
| 6,578,987 B1 | 6/2003 | Hough et al. | |
| 6,607,280 B2 | 8/2003 | Koyama et al. | |
| 6,796,682 B2 | 9/2004 | Hough et al. | |
| 6,796,683 B2 | 9/2004 | Wood et al. | |
| 6,857,752 B2 | 2/2005 | Eckhardt | |
| 6,923,546 B2 | 8/2005 | Kurematsu | |
| 7,004,604 B2 | 2/2006 | Ohmae et al. | |
| 7,088,321 B1 * | 8/2006 | Parker | 345/83 |
| 2001/0055209 A1 | 12/2001 | Dedoro | |
| 2002/0181231 A1 * | 12/2002 | Luk | 362/240 |
| 2005/0213345 A1 | 9/2005 | Inamoto | |
| 2006/0007686 A1 | 1/2006 | Hough | |

FOREIGN PATENT DOCUMENTS

| | | |
|---|---|---|
| DE | 199 01 669 A1 | 8/2000 |
| EP | 1 152 185 A2 | 11/2001 |
| FR | 2 582 779 A1 | 12/1986 |
| FR | 2 667 954 A1 | 4/1992 |
| GB | 629266 A | 9/1949 |
| GB | 2 239 938 A | 7/1991 |
| GB | 2 382 405 A | 5/2003 |
| WO | WO 2007/139912 A2 | 12/2007 |

OTHER PUBLICATIONS

Supplementary European Search Report dated Mar. 9, 2009 in connection with European Patent Application No. EP 04 81 1513.

Office Action dated Aug. 28, 2008 in U.S. Appl. No. 11/796,999.

Notification of Transmittal of the International Search Report and the Written Opinion of the International Searching Authority, or the Declaration dated Oct. 7, 2008 in connection with PCT Application No. PCT/US2008/005574.

Eugene Hecht, et al., "Geometrical optics-paraxial theory", Optics, Feb. 1979, 4 pages.

* cited by examiner

OPTICAL SYSTEM WITH ARRAY LIGHT SOURCE

CROSS-REFERENCE TO RELATED APPLICATIONS

This application is related to and claims priority as a continuation-in-part of U.S. patent application Ser. No. 10/992,802, filed Nov. 19, 2004 now U.S. Pat. No. 7,226,188. The above application is commonly assigned to the assignee of the present invention. The disclosure of the above application is hereby incorporated by reference for all purposes as if fully set forth herein.

TECHNICAL FIELD

The present invention relates generally to optical systems and more particularly to an optical system having an array light source.

BACKGROUND

Spot luminaries, such as stage lighting instruments, nightclub lighting instruments and the like having motorized subsystems operated by remote-control means are commonly referred to as "moving lights" or "automated luminaires." Among these are two general varieties: spot luminaires and wash luminaires. Spot luminaires are similar to the "profile spot" or ellipsoidal reflector spotlight commonly used in theaters, and provide a hard-edged beam of light. This kind of spotlight has a gate or aperture at which various devices can be placed to define the shape or profile of the light beam and has a projection optical system including one or more objective lens elements. A spot luminaire projects an image of the brightly-illuminated gate aperture, including whatever light-shaping, pattern-generating, or image-forming devices might be placed there. Wash luminaires are similar to the "Fresnel Spot" luminaire, which provides a soft-edged, ill-defined beam that can be varied in size by moving the lamp and reflector towards or away from the lens. This kind of wash light has no gate aperture and projects no image, but projects only a soft-edged pool of light shaped by whatever lens or lenses are mounted over the exit aperture of the luminaire.

The development of a spot luminaire having a fully cross-fadeable color mixing system and that is capable of projecting a smooth and uniformly colored beam of light has long been a goal of many lighting manufactures. Although many efforts have been made to develop such luminaires, each of these efforts has failed to achieve the desired goals. A more detailed description of such efforts can be found in U.S. Pat. No. 6,578,987 to Hough et al. which is hereby expressly incorporated by reference.

Typical prior art spot luminaires, and some particular problems associated with them are now discussed with reference to FIGS. 1-6. When referencing the attached figures, like numerals are used to describe like structures when appropriate.

Turning first to FIG. 1, a typical prior art spot luminaire projection optical system is generally indicated by the numeral 10. The optical system 10 includes a lamp 15 and a concave reflector 17. Together the lamp 15 and concave reflector 17 comprise a light source 20. The optical system 10 also includes a field stop/projection gate 25, a light pattern generator 26, and a projection lens 30. The light exits the projection lens 30 and travels over a distance 32 to a distant projection surface 35. For simplicity, the distant projection surface 35 can be considered to be at least six meters (twenty feet) from the projection lens 30. It should be noted that the outer "zigzag" boundary lines between the reflector and lens of this figure represent "edge rays," which show the outer boundaries of the path of the light from the light source 20 as it travels through the optical system from left to right. This convention applies to all figures incorporated herein. Of course, a single ray of light travels in a straight line unless being reflected or refracting through a lens.

As shown in FIG. 1, the light source 20 can be thought of as illuminating an object 38 (here shown as an up-right arrow) located at the projection gate 25. The object 38 can simply be an aperture formed in the field stop/projection gate 25, or the object 38 can be a light pattern generator 26 which is located at the projection gate 25. An image of the projection gate 25 (or the light pattern generator 26 contained therein) is projected onto the distant projection surface 35. The image of the object 38 is shown by an inverted arrow 40 located on the distant projection surface 35.

The basic optical system which is shown in FIG. 1 will project a polychromatic (white) beam of light. While a white beam of light is useful in many cases, the development of a smooth and uniformly colored beam of light has long been a goal of many lighting manufactures. One of the easiest ways to impart color to a beam of light is through the use of simple absorptive color filters as described below.

Turning now to FIG. 2, the use of absorptive color filters, or "gels", to impart color to a beam of light is described. Here a typical prior art spot luminaire projection optical system is indicated by the numeral 50. The basic structure of the spot luminaire projection optical system 50 is the same as the optical system 10 described above with reference to FIG. 1. However, in addition to the previously described structures, the optical system 50 also includes an absorptive color filter medium or gel 55 which is shown to the right of the projection lens 30. Since the gel 55 is larger then the projection lens 30, the light exiting the spot luminaire 50 passes through the gel 55. The result is a uniformly colored image 40 of the projection gate 25 and the light pattern generator 26 contained therein.

Referring now to FIG. 3, the use of dichroic filters to impart color to a beam of light is described. Here a typical prior art spot luminaire projection optical system is indicated by the numeral 60. The basic structure of the spot luminaire projection optical system 60 is the same as the optical system 10 described above with reference to FIG. 1. However, in addition to the previously described structures, the optical system 60 also includes a dichroic filter 65. The dichroic filter 65 is typically positioned near the projection gate 25, and can therefore be much smaller than corresponding gel filters of the same color. Due to their small size, it is possible for a number of dichroic filters 65 to be positioned on a wheel hub and rotated into the beam of light, allowing for rapid color changes. All of the light exiting the spot luminaire 60 passes through the dichroic filter 65, resulting in a uniformly colored image 40 of the projection gate 25 and any light pattern generator 26 contained therein.

Turning now to FIG. 4, a variable density patterned dichroic color filter wheel 70 is described. Variable density patterned dichroic color filter wheels 70 such as this have been employed in some prior art spot luminaire projection optical systems. When a color filter wheel 70 is used, it will typically be positioned between the concave reflector 17 and the projection gate 25 (as shown in FIG. 5). As shown best in FIG. 4, the density of the pattern etched onto the color filter wheel 70 varies radially around the wheel 70. FIG. 4 shows the beam of light 75 passing through the color filter wheel 70 as a circle. When the variable density patterned dichroic color filter wheel 70 is rotated, the saturation level of the beam's color will increase or decrease, depending on the position of the wheel 70 in relation to the beam 75.

As best shown by FIG. 4, the patterned dichroic color filter wheel 70 is patterned with a number of fingers 77. The thickness of each finger 77 varies radially around the wheel 70. The saturation of the color in the projected beam 75 depends on the wheel's location in relation to the beam 75. For example, when the wheel 70 is positioned so that the beam of light 75 passes through the clear portion of the wheel 70 (as shown in FIG. 4) the projected beam will be white.

Turning now to FIG. 5, a prior art spot luminaire projection optical system 80 which incorporates a single patterned dichroic color filter wheel 70 is shown. The basic structure of the spot luminaire projection optical system 80 is similar to the optical system described above with reference to FIG. 1. However, in addition to the previously described structures, the optical system 80 also includes a single patterned dichroic color filter wheel 70. The patterned dichroic filter wheel 70 is positioned near the projection gate 25 to ensure that the wheel 70 is as small as possible. Since the pattern 77 is located adjacent to the light pattern generator 26 and the projection gate 25, the pattern 77 etched onto the color filter wheel 70 is visible in the projected beam of light, and will be imaged on the distant projection surface 35. The visibility and imaging of the pattern 77 is undesirable as the projected beam of light will not be smooth and uniformly colored.

In an attempt to ameliorate this problem, a diffusing optical element 85 (FIG. 6) can be placed in the beam path. The diffusing optical element 85 can be positioned between the patterned color filter media 70 and the projection gate 25. The diffusing optical element 85 serves to blur the image of the pattern 77 etched onto the color filter wheel 70. The effect is similar to viewing a scene through a frosted glass window; the detail (in this case the pattern 77 etched onto the color filter 70) is not discernable.

FIG. 6 shows a prior art spot luminaire projection optical system 90. The basic structure of the spot luminaire projection optical system 90 is similar to that of optical system 10 which was described above with reference to FIG. 1. However, in addition to the previously described structures, the optical system 90 also includes a patterned color and dimming apparatus 95 (consisting of cyan, yellow, and magenta color wheels and a patterned dimmer wheel) and a diffusing optical element 85. Although the beam of light will be uniformly colored, the diffusing optical element 85 will scatter light out of the projection lens system 30. This results in a loss of energy in the projected beam, which is undesirable. The light rays being scattered outside of the projection lens 30 are indicated by the numeral 97.

The present invention was principally motivated by a desire to address the above-identified issues. However, the invention is in no way so limited, and is only to be limited by the accompanying claims as literally worded and appropriately interpreted in accordance with the Doctrine of Equivalents.

SUMMARY

Aspects of the invention may be found in a projection optical system that includes a light source array, a projection gate, a projection lens, and a relay lens group. The projection gate is located between the light source array and the projection lens and the projection lens is configured to project an image of the projection gate. The relay lens group is located between the light source array and the projection gate and is configured to prevent the projection lens from projecting an image of the light source array.

Other aspects of the invention may be found in a projector that includes a housing, a light source array, a projection gate, a projection lens, and a relay lens group. The light source array and the relay lens group are located inside the housing. The projection gate is located between the light source array and the projection lens and the projection lens is configured to project an image of the projection gate. The relay lens group is located between the light source array and the projection gate and is configured to prevent the projection lens from projecting an image of the light source array.

Still other aspects of the invention may be found in a method that includes positioning a light source array to illuminate a projection gate. The method also includes configuring a projection lens to project an image of the projection gate, the projection gate being located between the light source array and the projection lens. The method further includes configuring a relay lens group located between the light source array and the projection gate to prevent the projection lens from projecting an image of the light source array.

Yet other aspects of the invention may be found in a lamp housing for use with a projector housing, where the projector housing includes a projection lens projecting an image of a projection gate. The lamp housing includes a light source array and a relay lens group that is located between the light source array and the projection gate. The relay lens group is configured to prevent the projection lens from projecting an image of the light source array.

Other aspects of the invention may be found in an illumination source for a plurality of optical fibers that includes a housing. The housing includes a coupling, a light source, and a relay lens group located between the light source and the coupling. The relay lens group is configured to prevent an image of the light source from being formed at input ends of a plurality of optical fibers positioned in the coupling.

Still other aspects of the invention may be found in a method that includes providing a light source and configuring a relay lens group between the light source and a coupling. The relay lens group is configured to prevent an image of the light source from being formed at input ends of a plurality of optical fibers located in the coupling.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

The readers of this document should understand that the embodiments described herein may rely on terminology used in any section of this document and other terms not readily apparent from the drawings and language common therefore. This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with one, some or all embodiments may be used for describing and defining the technology and exclusive rights associated herewith.

The present invention utilizes a patterned color and dimming apparatus, deployed near a small aperture, to uniformly color a projected beam of light. It should be noted, that because the size of the color and dimmer wheels depend on the size of the aperture, it is advantageous that the aperture be as small as possible.

Figure 1:
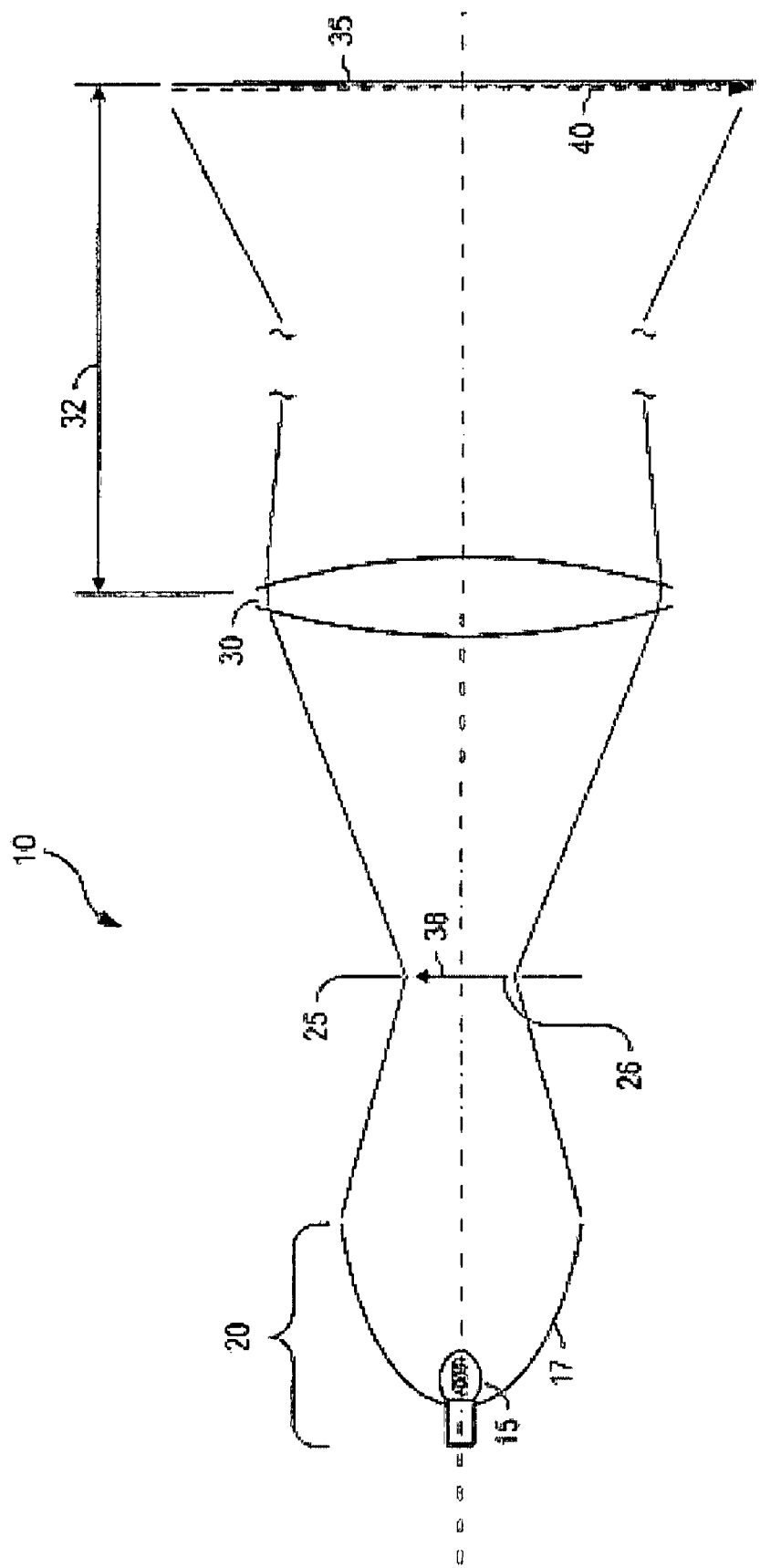
FIG. 1 is a schematic diagram of a prior art projection optical system.
Figure 2:
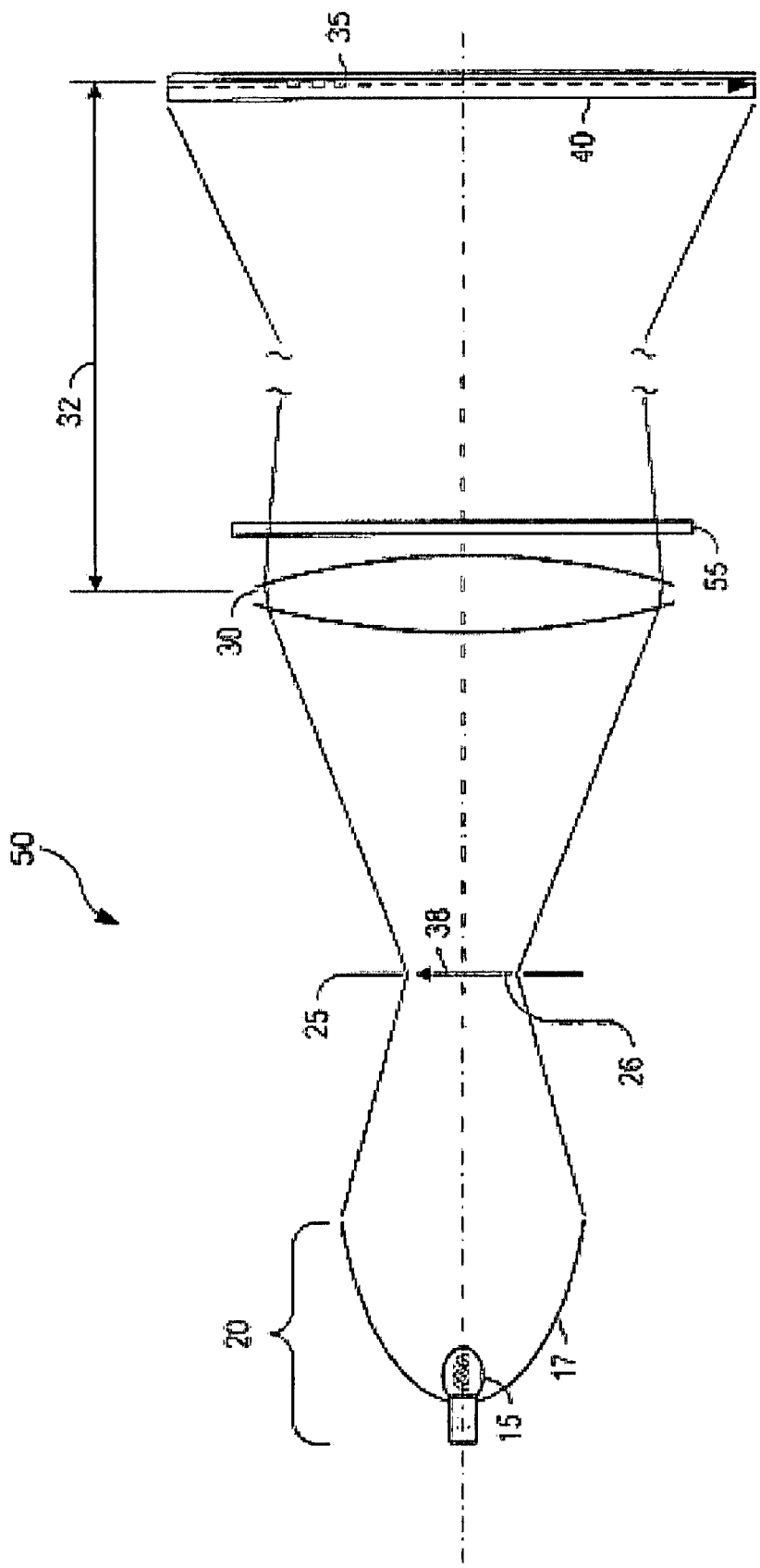
FIG. 2 is a schematic diagram of a prior art projection optical system including an absorptive color filter.
Figure 3:
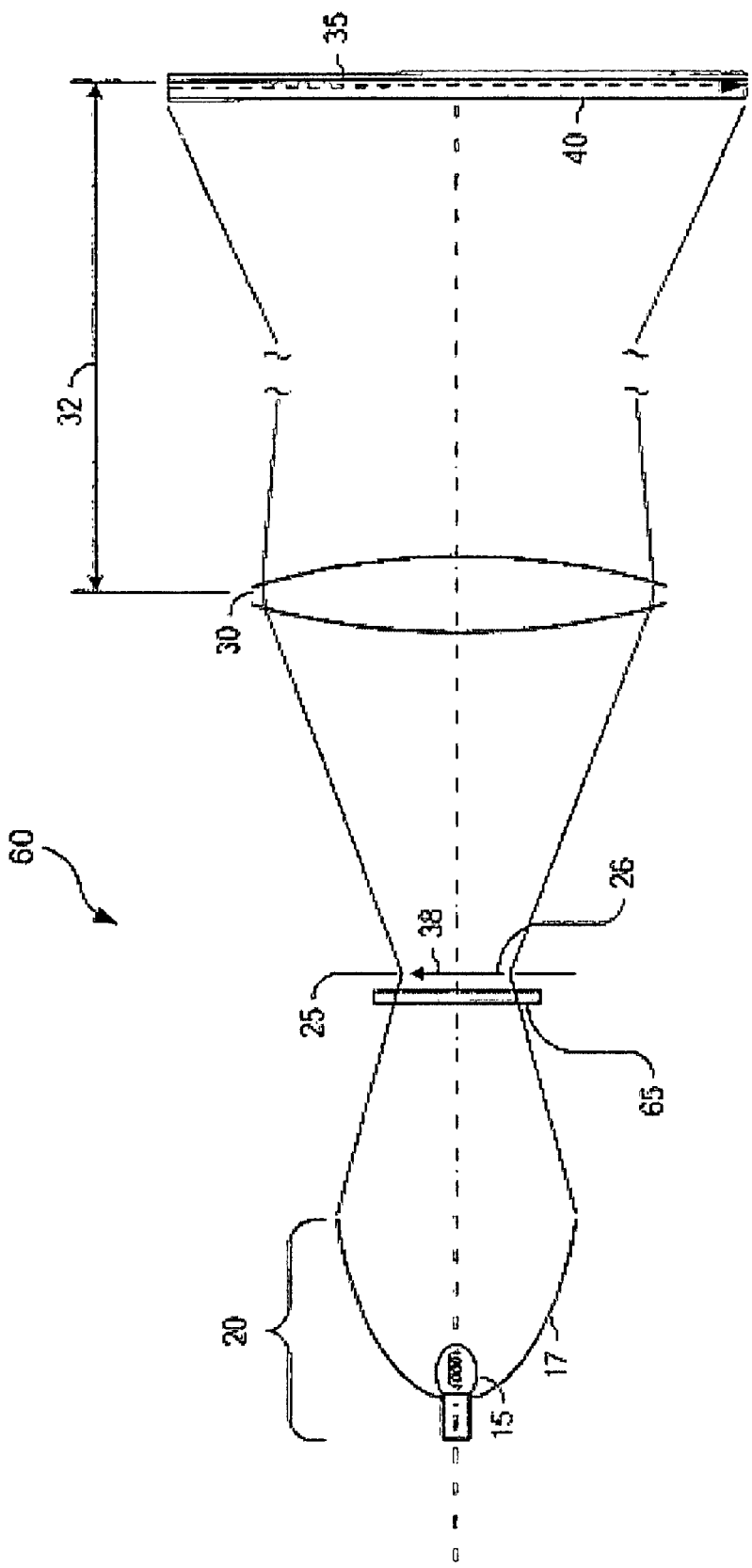
FIG. 3 is a schematic diagram of a prior art projection optical system containing an unpatterned dichroic color filter.
Figure 4:
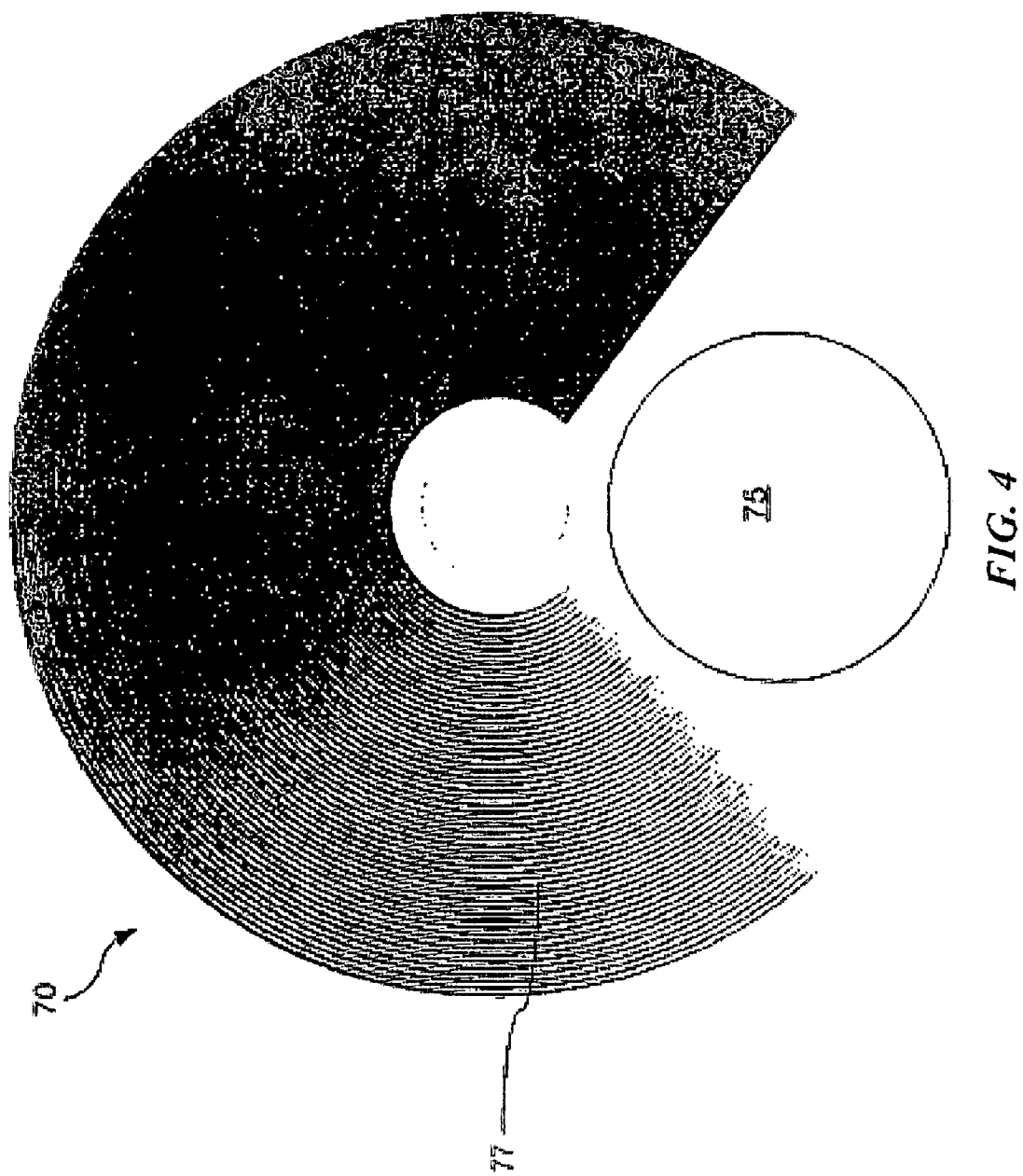
FIG. 4 is a pictorial representation of a patterned dichroic color wheel.
Figure 5:
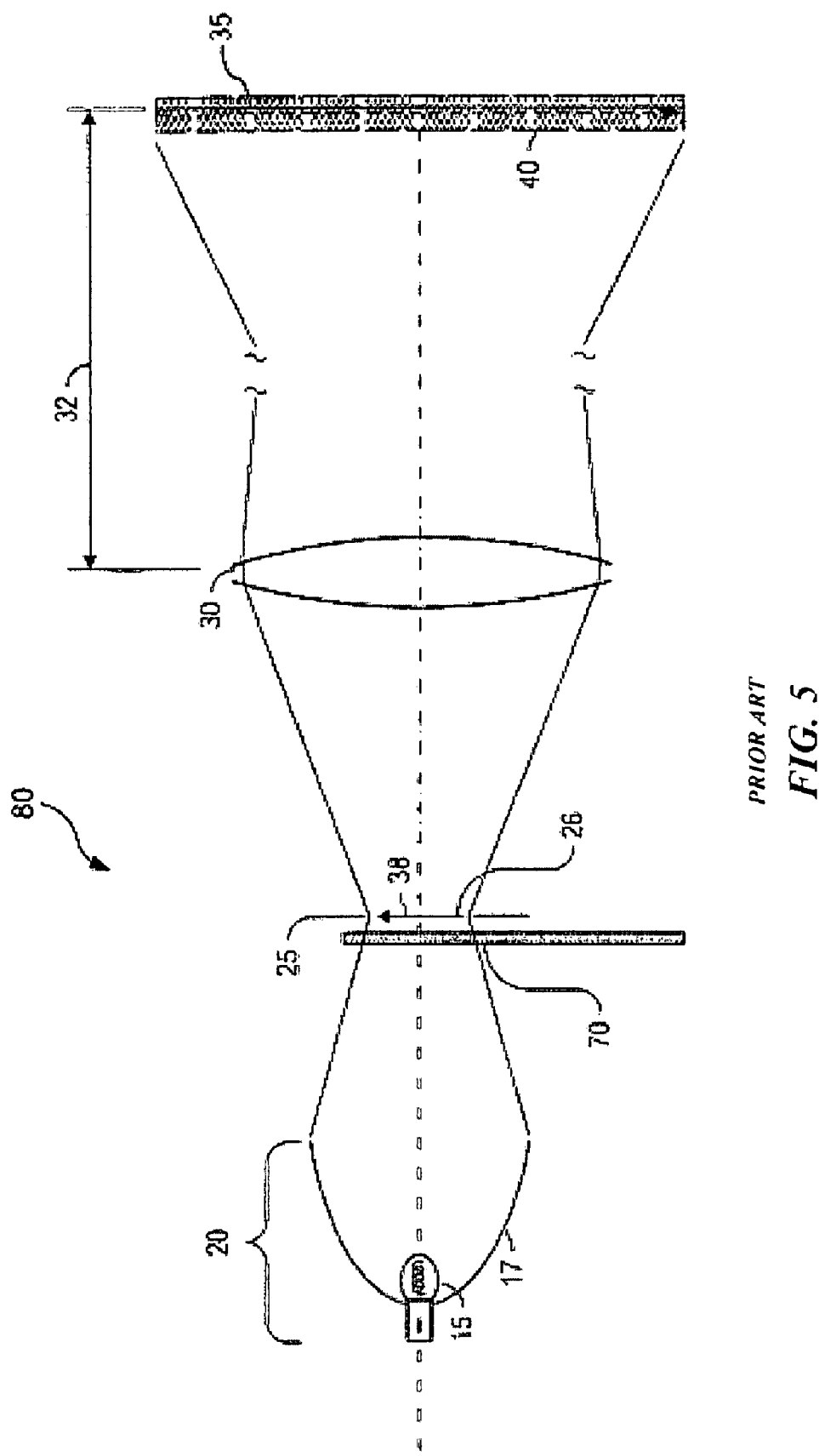
FIG. 5 is a schematic diagram of a prior art projection optical system including a patterned dichroic color filter.
Figure 6:
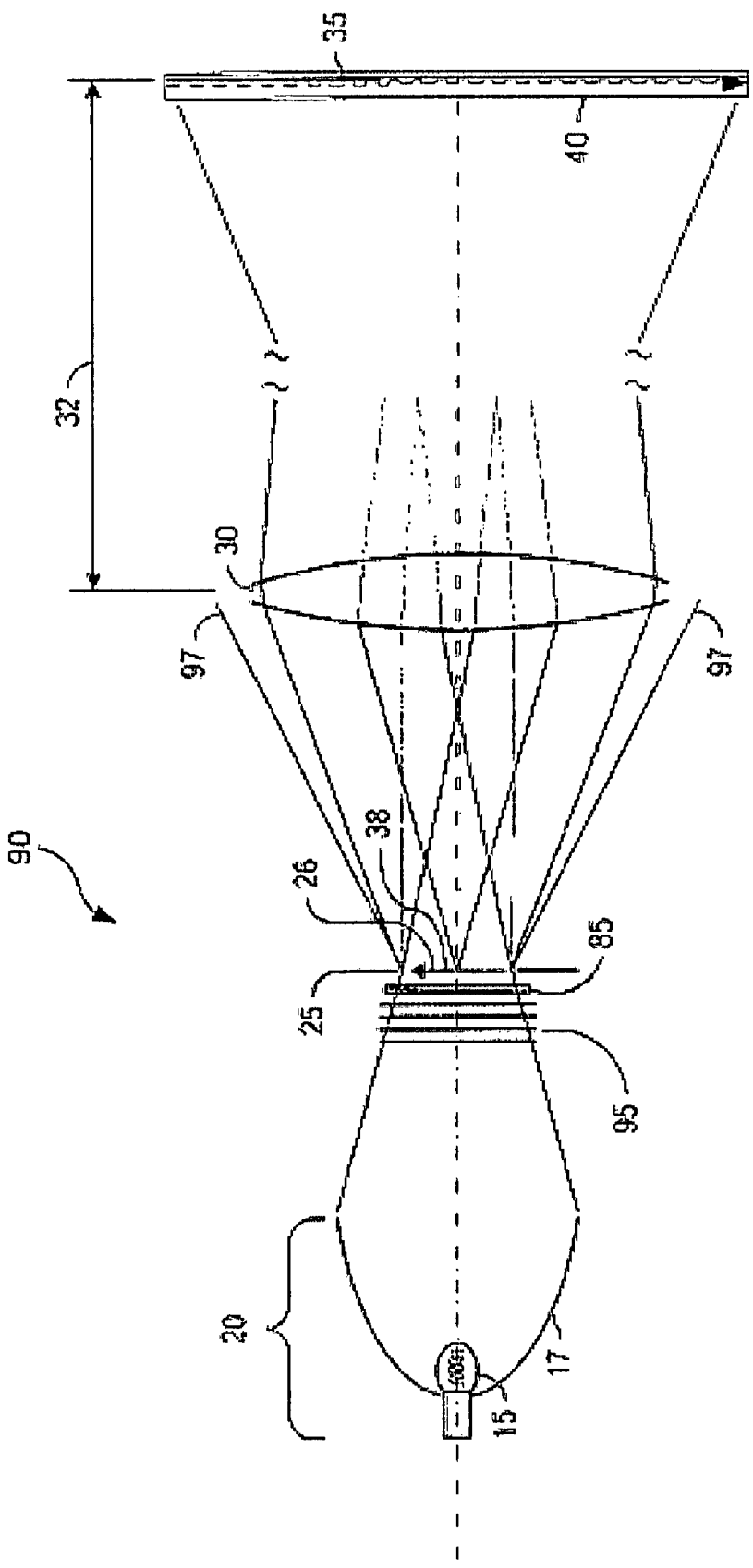
FIG. 6 is a schematic diagram of a prior art projection optical system including a patterned color filter and dimming apparatus and a diffusing optical element.

To avoid losing energy from the projected beam due to the scattering of light by a diffusing optical element, as was the case with the prior art depicted in FIG. 6 and described above, it is desirable to relocate the real image of the patterned color and dimming wheels to a volume of space that is not imaged by the projection lens. As described below, the addition of a weak negative lens to a relay lens group can serve to relocate the image of the color and dimming system to a volume of space that is not imaged by the projection lens. By "weak" is meant that the absolute value of the negative power of the lens is less than the combined power of the downstream positive lens group. This results in a highly efficient projection system with a uniformly colored projected beam.

Figure 7:
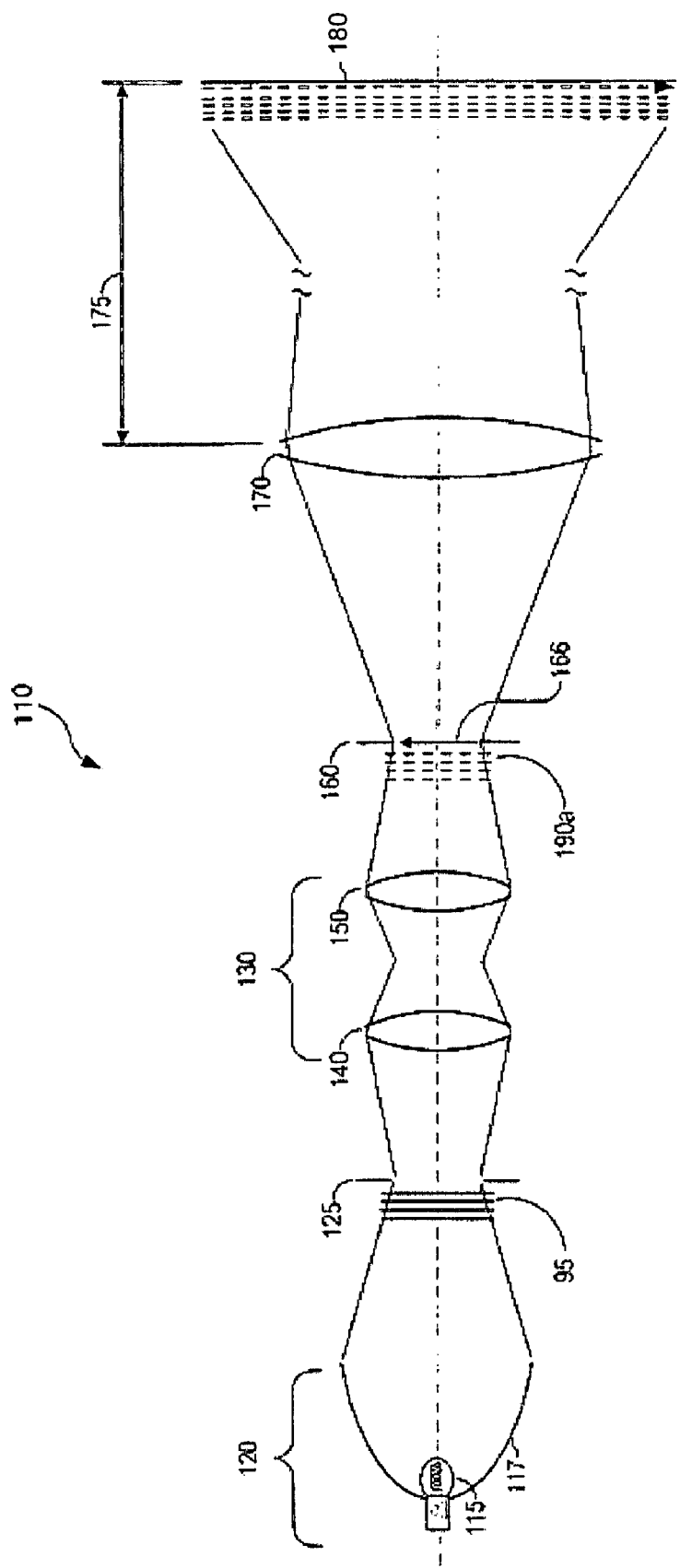
FIG. 7 is a schematic diagram of a projection optical system including a patterned color and dimming apparatus and a relay lens system.

Referring now to FIG. 7, this figure shows a spot luminaire projection optical system generally indicated by the numeral 110. The optical system 110 includes a lamp 115 and a concave reflector 117. Together, the lamp 115 and the concave reflector 117 form the light source 120. The optical system 110 also includes a first field stop 125. A patterned color and dimming apparatus 95 is located in a volume contiguous to the first field stop 125. A positive relay lens group 130 is shown to include a first positive lens 140 and a second positive lens 150. The optical system 110 also includes a second field stop 160 which is coincident with the projection gate, a light pattern generator 166, and a projection lens 170. A distance 175 separates the projection lens 170 from a distant projection surface 180. The positive relay lens group 130 relays an image 190a of the patterned color and dimming filters 95 and first field stop 125, forming said image 190a at a volume contiguous to the second field stop 160. The second field stop 160 is located some distance downstream of the positive relay lens group 130. The second field stop 160 is the same size, and in the same location, as the projection gate. Since the second field stop/projection gate 160 are coincident, the real images 190a of the patterned color and dimming wheels 95 act as objects for the projection lens 170. Therefore, the projected beam not only contains an image of the projection gate 160 and the pattern generator 166, but also contains an image of the patterned color and dimmer wheels 190a. It would, however, be preferable to not have the image of the patterned color and dimming filters 95 formed at the projection surface 180.

Figure 8:
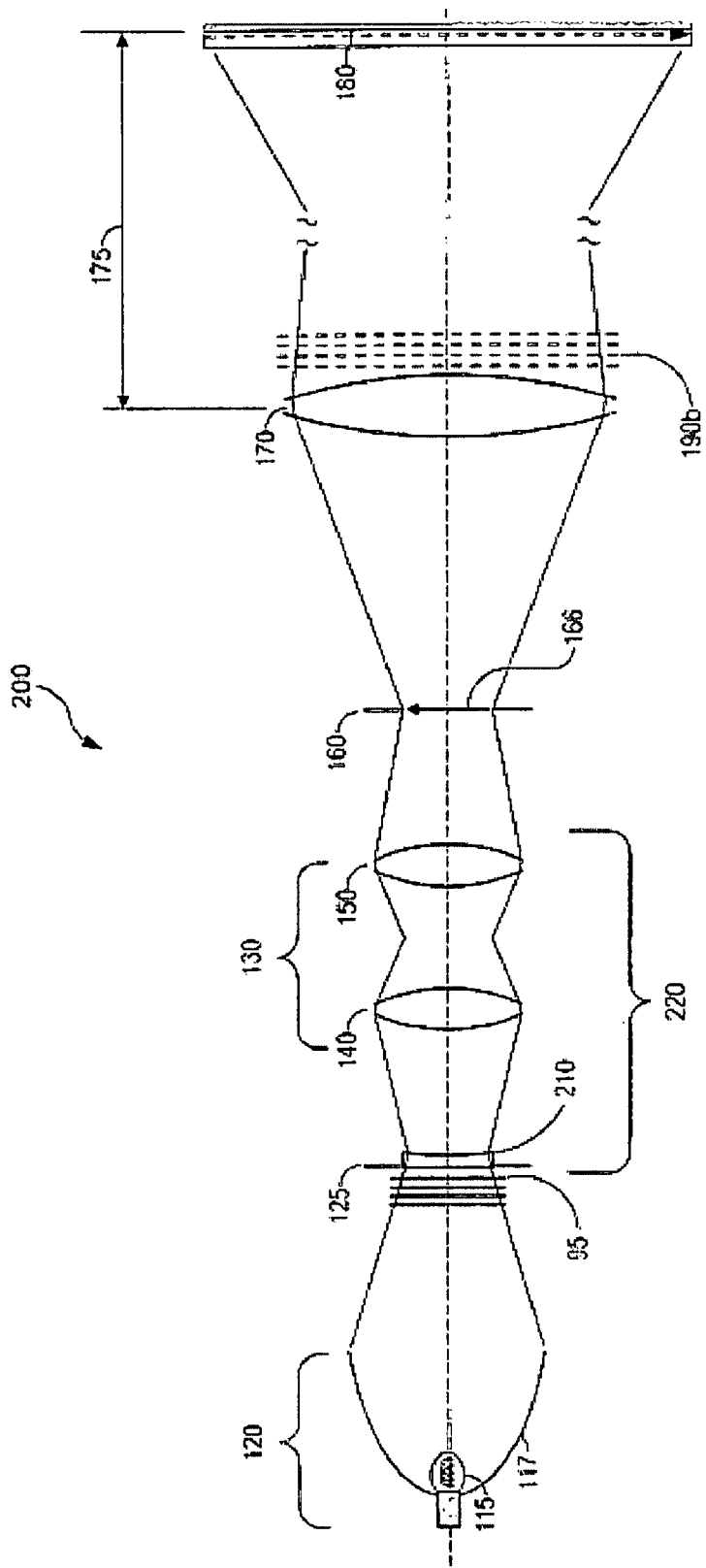
FIG. 8 is a schematic diagram of a projection optical system including a patterned color and dimming apparatus and a relay lens system including a negative lens at the first field stop according to the present invention.

Referring now to FIG. 8, a spot luminaire projection optical system according to the present invention is generally indicated by the numeral 200. The optical system 200 includes a lamp 115 and a concave reflector 117. Together, the lamp 115 and the concave reflector 117 form the light source 120. The optical system 200 also includes a first field stop 125. A patterned color and dimming apparatus 95 is located in a volume contiguous to the first field stop 125. A positive relay lens group 130 is shown to include a first positive lens 140 and a second positive lens 150. The optical system 200 also includes a negative relay lens group 210. Together the positive relay lens group 130 and the negative relay lens group 210 comprise the relay lens group or overall relay lens group 220. The optical system 200 also includes a second field stop 160 which is coincident with the projection gate and a light pattern generator 166. The optical system 200 further includes a projection lens 170 which functions to project a beam of light across distance 175 to a distant projection surface 180.

As shown in FIG. 8, the addition of a weak negative lens 210 (negative relay lens group) serves to relocate the image 190b of the color and dimming system to a volume of space that is not imaged by the projection lens 170. It is therefore possible, through design, to force the image 190b of the patterned filter media 95 and the first field stop 125 to lie within or beyond the projection lens train, in a volume that is not imaged by the projection lens 170. In one embodiment, this will be accomplished by disposing image 190b away from the second field stop. In another embodiment, the image of the color and dimming system is disposed downstream of the second field stop. In another embodiment, the image is disposed downstream of the upstream surface of the projection lens. In another embodiment, the image of the color and dimming system projected by the relay lens group 210 is disposed downstream of the downstream surface of the projection lens 170, but not proximate the projection surface.

A properly designed relay lens system 220 allows the patterned filter media 95 to be placed near the first field stop 125 which is the smallest area in the beam of light, while ensuring that the images 190b of the patterned filter media 95 and first field stop 125 occupy a volume that is not re-imaged by the projection lens 170. The result is superior color mixing of the projected beam while minimizing the size of the patterned color filter material. It is believed that this type of relay lens color and dimming apparatus will provide uniform color mixing and high optical throughput.

Figure 9:
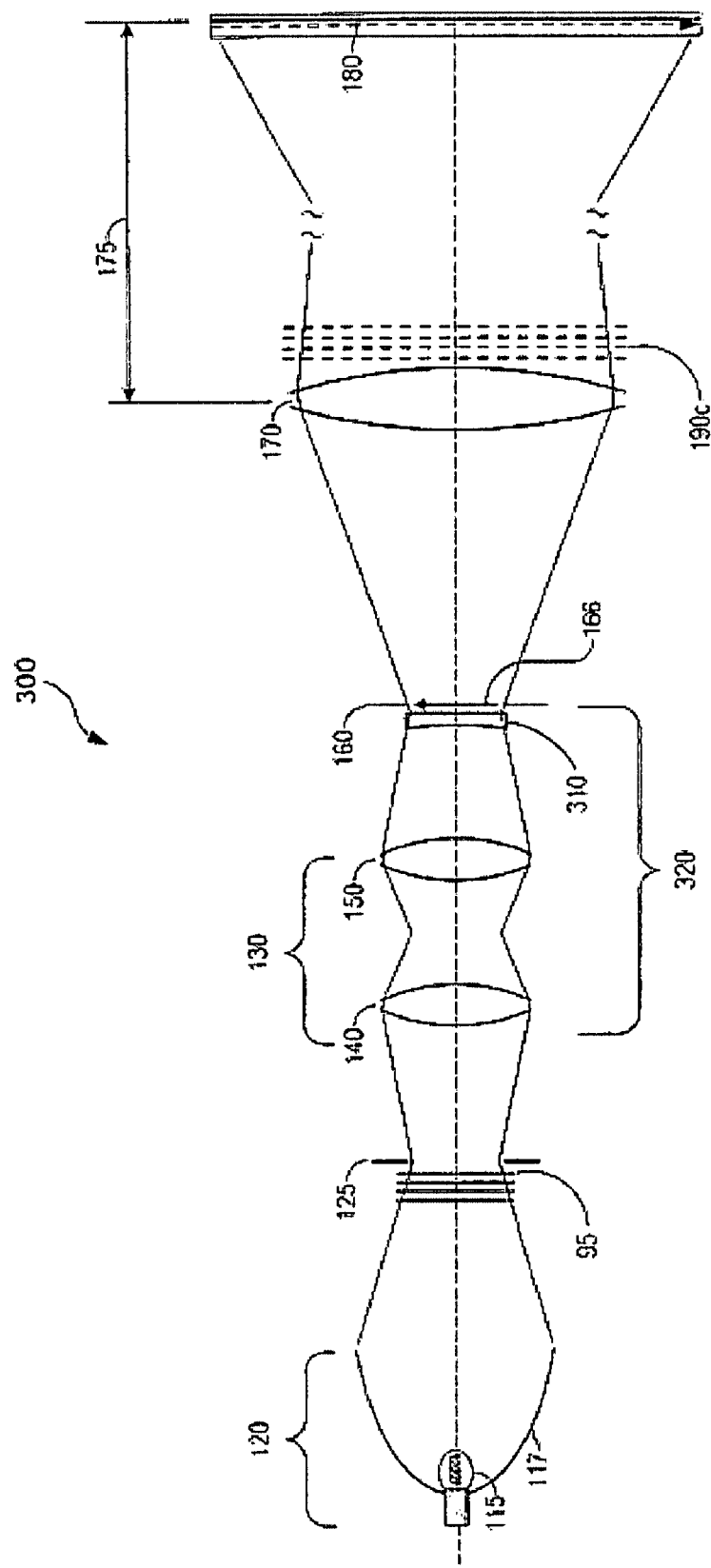
FIG. 9 is a schematic diagram of a projection optical system including a patterned color and dimming apparatus and a relay lens system including a negative lens at the second field stop according to the present invention.

Referring now to FIG. 9, another spot luminaire projection optical system 300 according to the present invention is described. Here the basic structure of the spot luminaire projection optical system 300 is similar to the optical system 200 described above with reference to FIG. 8. However, in this example, the negative relay lens group 310 is positioned near the second field stop 160. Together the positive relay lens group 130 and the negative relay lens group 310 comprise the relay lens group or overall relay lens group 320. The addition of a weak negative lens 310 serves to relocate the image 190c of the color and dimming system 95 to a volume of space that is away from the second field stop and not imaged by the projection lens 170.

Figure 10:
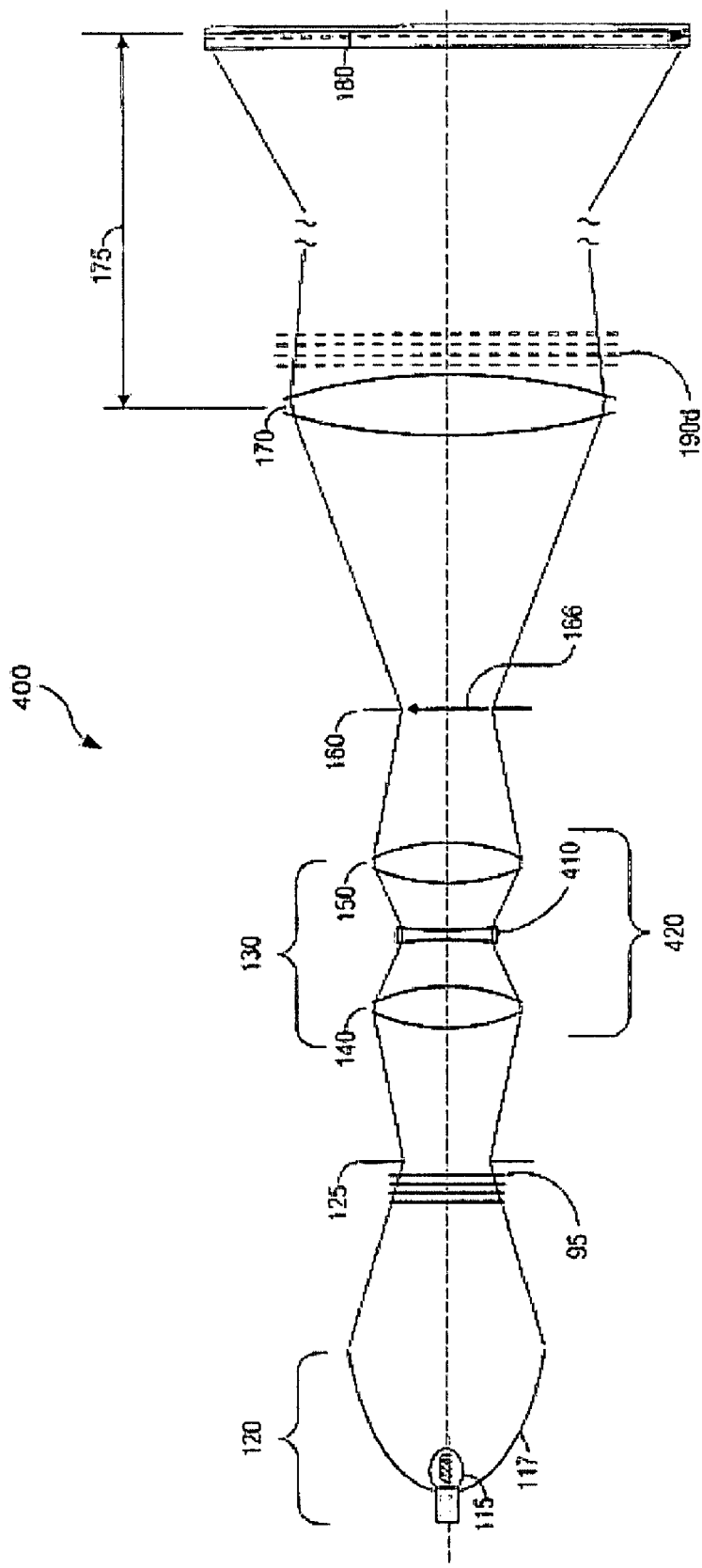
FIG. 10 is a schematic diagram of a projection optical system including a patterned color and dimming apparatus and a relay lens system including a negative lens positioned within the relay lens according to the present invention.

Referring now to FIG. 10, yet another spot luminaire projection optical system 400 according to the present invention is shown. Here the basic structure of the spot luminaire projection optical system 400 is similar to the optical system 200 described above with reference to FIG. 8. However, in this example, the negative relay lens group 410 is positioned within the positive relay lens group 130 (between the first positive lens 140 and the second positive lens 150). Together the positive relay lens group 130 and the negative relay lens group 410 comprise the relay lens group 420. The addition of a weak negative lens 410 serves to relocate the image 190d of the color and dimming system 95 to a volume of space that is not imaged by the projection lens 170.

Figure 11:
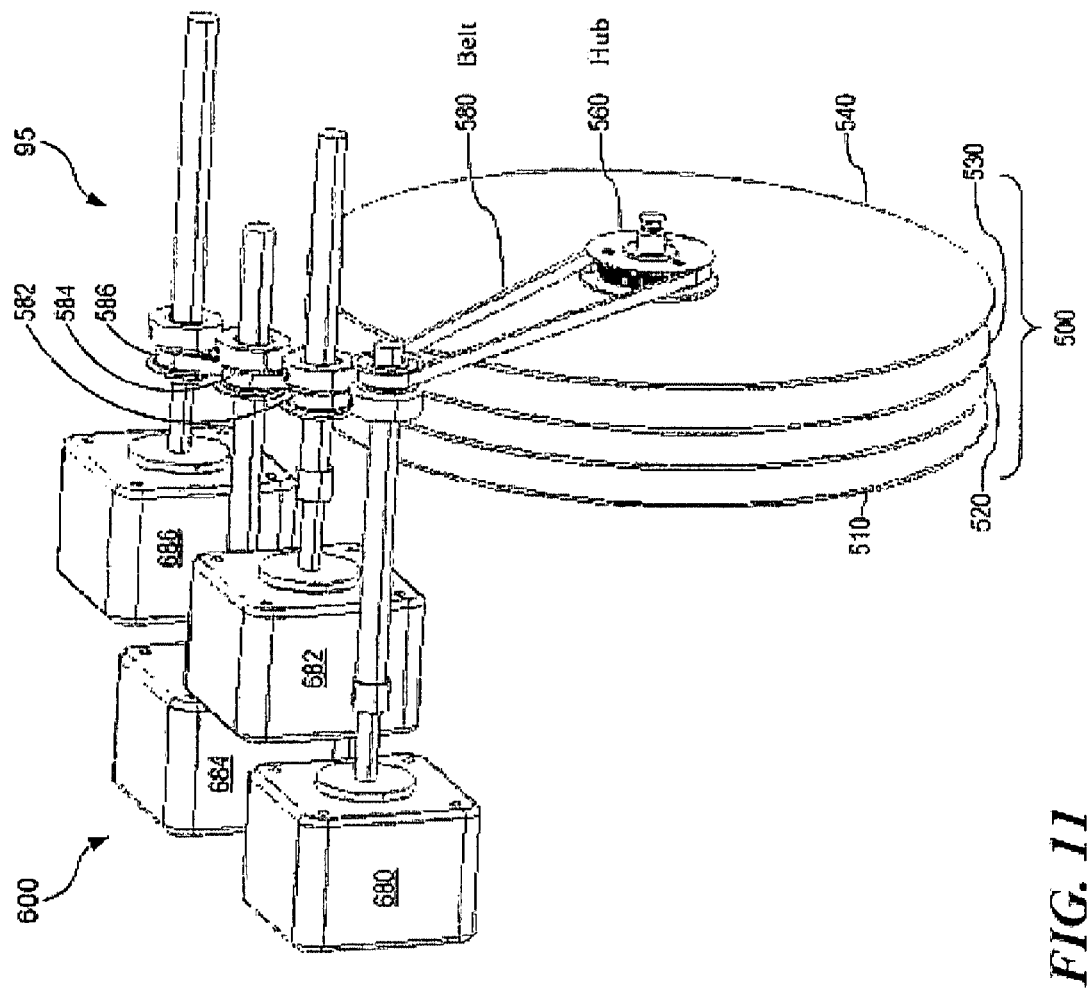
FIG. 11 is a pictorial representation of a motor driven color and dimming mechanism according to the present invention.
Figure 12:
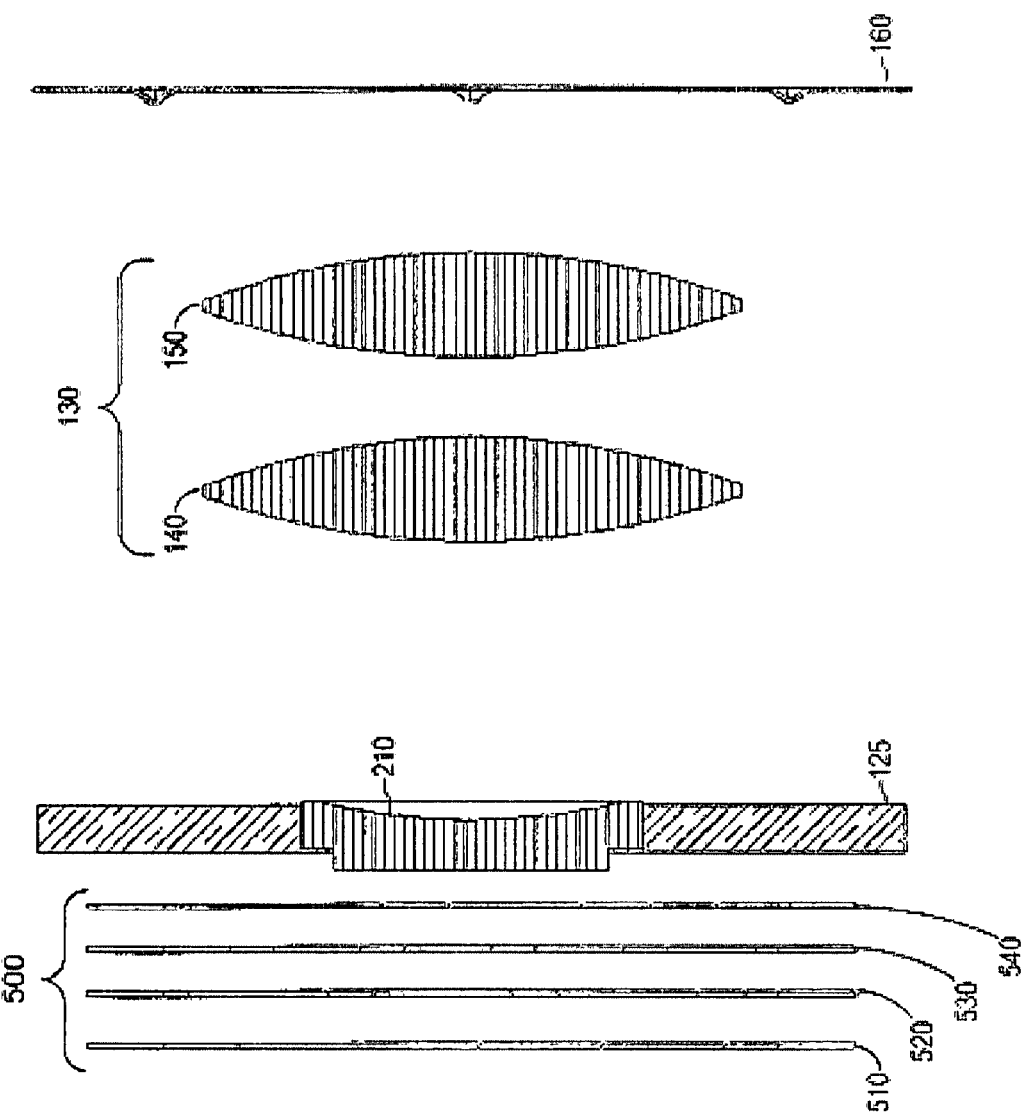
FIG. 12 is a pictorial representation of a relay lens color and dimming apparatus according to the present invention.

Referring now primarily to FIGS. 11 and 12, the filter apparatus 95 and other aspects of the invention are further described. As discussed previously, the filter apparatus 95 can be positioned proximate the first field stop 125. This placement of the filter apparatus 95 is shown in FIGS. 8-10 and 12. In these figures, one may also appreciate that the filter apparatus 95 can include a plurality of variable density filters.

In its basic form, the filter apparatus 95 can be adapted for selectively moving at least one variable density filter across the beam of light. However, as shown in FIGS. 11 and 12, the filter apparatus 95 can also be adapted for selectively moving or rotating a plurality of variable density filters 500 across the beam of light. These variable density filters 500 can be color filters and/or dimming filters. Therefore, movement can allow the operator to control the color and intensity (luminance) of the beam of light.

Referring now to FIG. 11, one implementation of the filter apparatus 95 is shown. In this example, the filter apparatus 95 is shown to include a series or stack of patterned wheels 500. Here the stack of patterned wheels 500 includes three color filter patterned wheels 510, 520 and 530. These correspond respectively to a cyan color wheel 510, a yellow color wheel 520, and a magenta color wheel 530. The remaining wheel is a dimming wheel 540. The filter apparatus 95 also includes a plurality of actuators or motors 600 which can be used for driving, moving, or causing rotation of the patterned wheels 500 in the beam of light.

Each of the wheels 500 includes a central hub. However, only the central hub 560 of the dimming wheel 540 is shown in the view provided by FIG. 11. The hub 560 of the dimming wheel 540 serves as a point of attachment for a drive belt 580. The drive belt 580 is also connected to one of the actuators 600. Here the drive belt 580 is connected to an actuator or motor 680 The hubs (not shown) of the remaining wheels (510, 520 and 530) are similarly coupled to drive belts 586, 584 and 582. These drive belts are in turn coupled to actuators or motors 686, 684 and 682. For example, when actuator 680 is activated, it will cause belt 580 to move, thereby causing rotation of the dimming wheel 540. The motors or actuators 600 can be mounted to a plate containing the first field stop 125. As each color filter 500 is rotated into the beam, it colors a portion of the rays passing through the first field stop 125. As the dimmer wheel 540 is rotated into the beam, it attenuates a portion of the rays passing through the first field stop 125 of the relay lens.

Thus, the patterned wheels 500 in the stack can be either color filters or dimming filters. One should appreciate that it is therefore possible to place a dimming filter, such as patterned wheel 540 at the first field stop location 125 (FIG. 12). The dimming filter works on the same principle as the color filters, except that it blocks the light rather than coloring it. Like the color filters, the dimmer can be located near the first field stop 125. Therefore, any pattern etched onto the dimmer 540 will not visible in the projected beam, and the dimmer 540 will merely control the amount of light present in the projected beam. It should be noted that, although patterned wheels 500 are depicted, the patterned media need not be in a wheel configuration. For example, the patterned media can be disposed on a sliding plate which can be used to slidably move to place the desired portion of the media into the light beam, rather than by rotating it, as with the wheel 500.

As described, the various color mixing systems or filter apparatus 95 can be positioned near the first field stop 125, which is located between the concave reflector 117 and the projection lens 170. The relay lens group (e.g., groups 220, 320 and 420) is designed so that a real image of the field stop 125 and color filter means 95 occupies a volume that is not re-imaged by the projection lens 170. These color filters can be composed of patterned color filter material deposited on substrates having any shape. As the filters 95 are moved into the path of the light beam, their edges are not visible and the projected image is evenly colored.

Regardless of the specific configuration of the filters and the dimmer, the projected image will have a fully blended homogeneous color. The actual shade and intensity of the image is dependent on the area of the field stop 125 covered by the unpatterned filter material. The principles of color filtering at a field stop are thus independent of any specific actuator means or specific filter shape.

Referring now to FIG. 12 which shows a relay lens color and dimming apparatus 95 according to the present invention. Patterned cyan, yellow, magenta, and dimmer wheels 510, 520, 530 and 540 are shown positioned before a first field stop plate 125. A weak negative lens 210 can be positioned in, and held by, the field stop plate aperture 125. A pair of lenses 140 and 150 comprises the positive lens relay group 130. A second field stop plate 160 is the same size, and in the same location, as the projection gate.

The color mixing system is well-suited for placement in the path of a high-intensity beam of light for illuminating a light pattern generator, gobo, or an image generator system. The color mixing system can also be used independently in any spot luminaire having a projection lens with a well defined projection gate.

Figure 13:
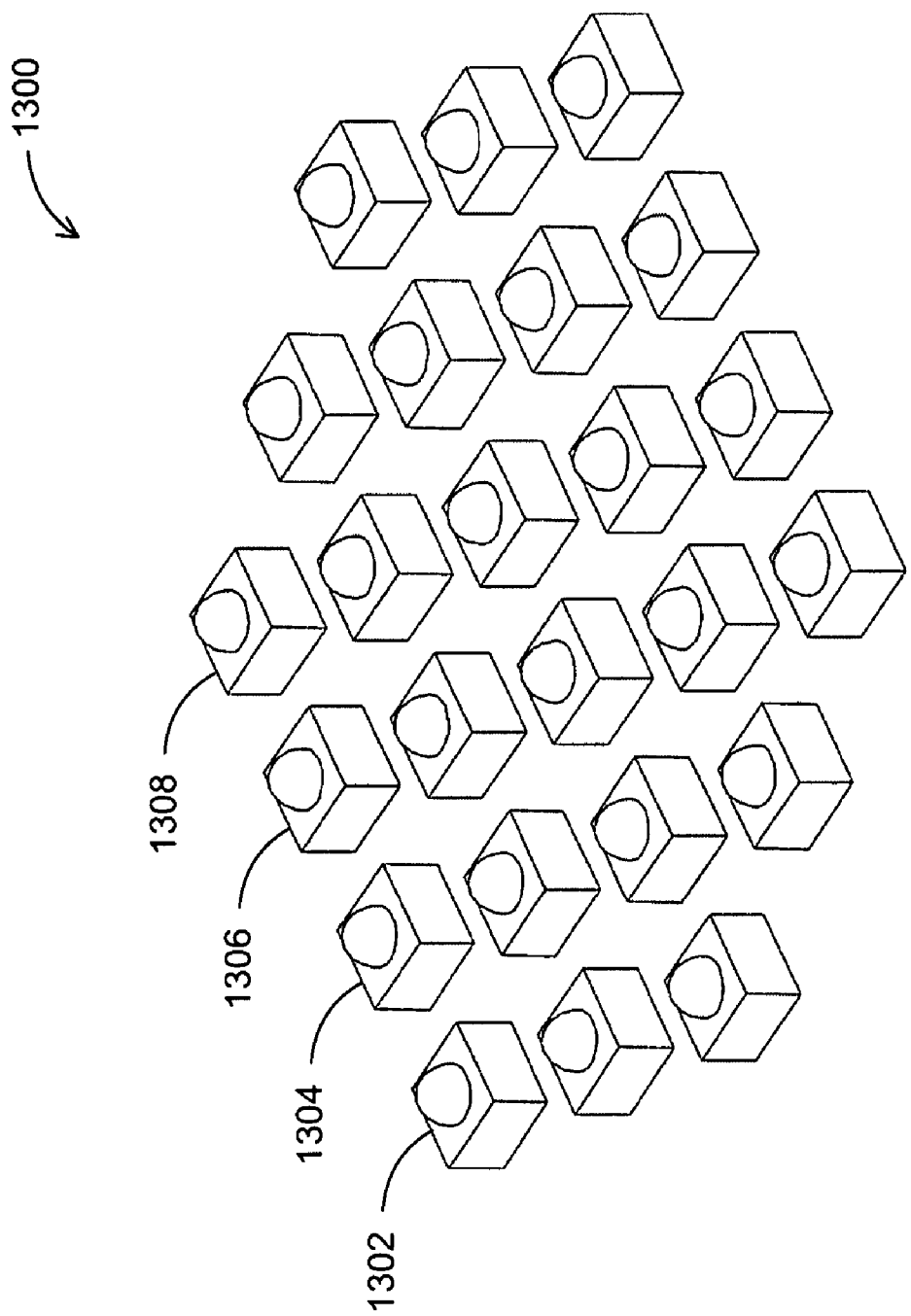
FIG. 13 is a light source array of light emitting diodes.

FIG. 13 is a light source array 1300 of light emitting diodes (LEDs). In this example, array 1300 includes red LED 1302, green LED 1304 and blue LED 1306. The remaining LEDs in the array 1300 include substantially equal numbers of red, green and blue LEDs. The red, green and blue light from the LEDs of the array 1300 may be combined in desired proportions to provide light of a desired color. In other embodiments of the invention, an LED 1308 having a fourth color may be included in the array 1300 to combine with the LEDs 1302, 1304 and 1306 in order to produce a full-spectrum white light.

It will be understood that any number of light sources of differing colors may be used to produce light having a desired spectral characteristic without departing from the scope of the invention. In other embodiments of the invention, all light sources in the light source array 1300 may be of the same color, e.g., white. This may be done to combine the light output from several light sources to obtain a desired intensity level. While the light source array 1300 is shown with 24 LEDs, it will be understood that a light source array according to the present invention may comprise any number of light sources greater than one.

The LEDs of array 1300 are arranged in a hexagonal pattern. It will be understood that other arrangements of light sources, such as an orthogonal pattern, could be used without departing from the scope of the invention. The light source array 1300 is a planar array, but it will be understood that an array of light sources could be arranged to form a smoothly curved surface or an irregular surface without departing from the scope of the invention.

Figure 14:
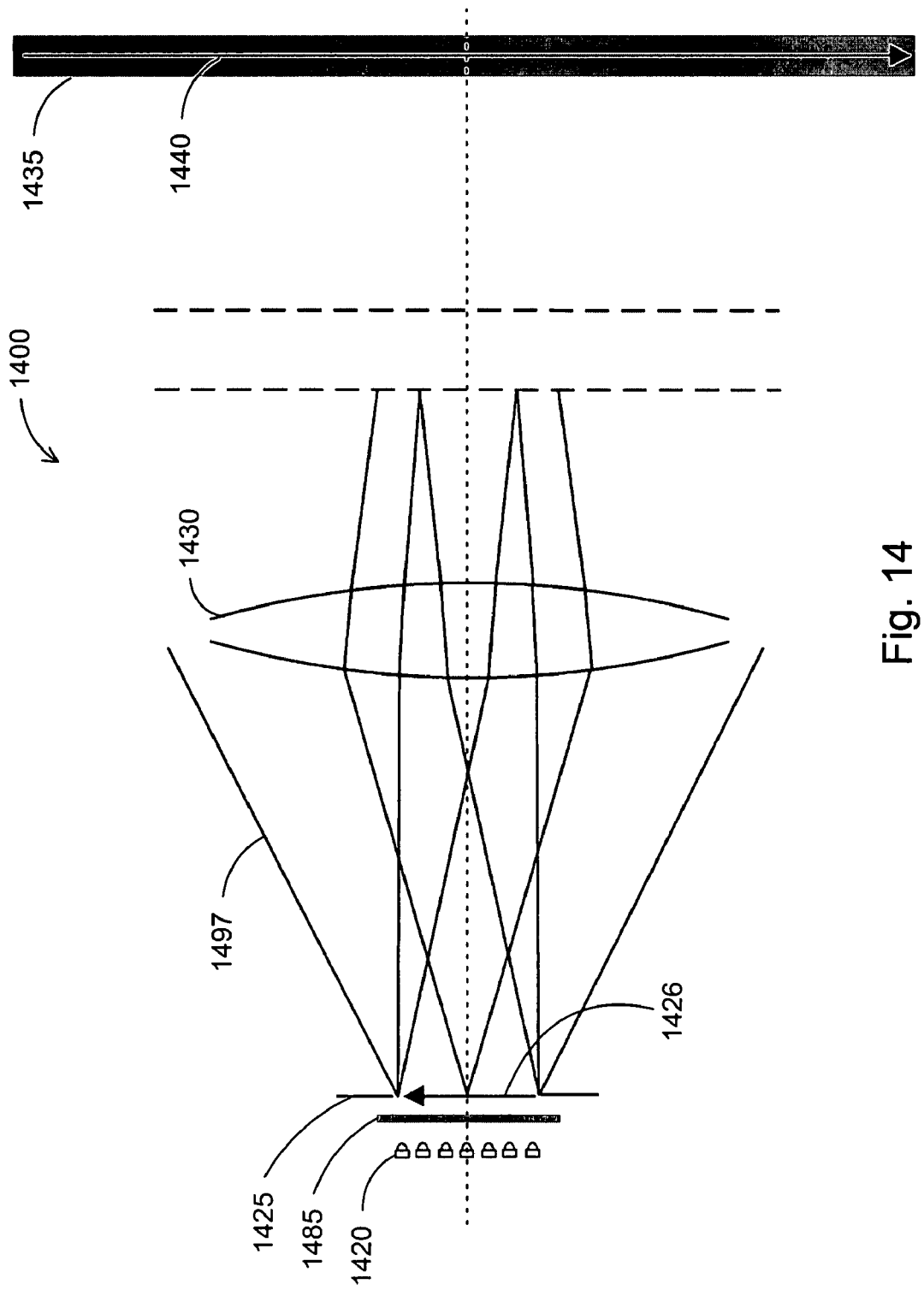
FIG. 14 is a projection optical system including a light source array.

FIG. 14 is a projection optical system 1400 including a light source array 1420. A diffusing optical element 1485 blurs the pattern of the light source array 1420 and blends the colors of the individual light sources of the array 1420 to provide an evenly colored light beam to illuminate a projection gate 1425. A projection lens 1430 causes an image 1440 of the projection gate 1425 (or of a light pattern generator 1426 contained within the projection gate 1425) to be projected onto a distant projection surface 1435. The image 1440 has a color determined by the blended color of the light source array 1420.

Without the diffusing optical element 1485, the projection lens would also project an image of the light source array 1420 on the projection surface 1435. Thus, the diffusing optical element 1485 both blends the colors and blurs the pattern of the individual light sources of the array 1420. However, as described with regard to FIG. 6, the diffusing optical element 1485 causes an undesirable loss of energy from the projected beam by scattering light outside the projection lens 1430, as indicated by reference character 1497.

Figure 15:
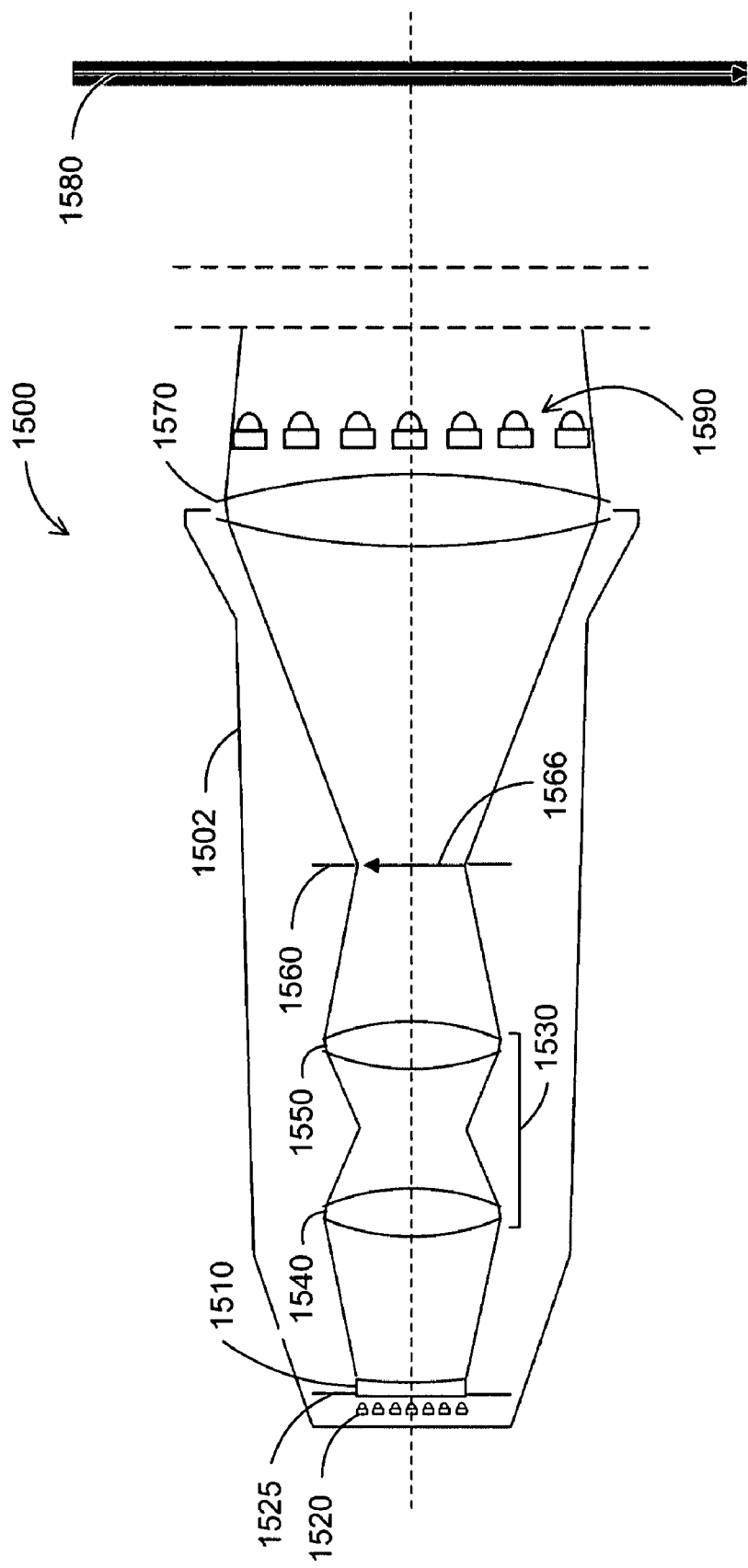
FIG. 15 is a projector embodying the present invention including a light source array.

FIG. 15 is a projector 1500 embodying the present invention including a light source array 1520. The light source array 1520, a field stop 1525, a negative relay lens group 1510, a positive relay lens group 1530 that includes lenses 1540 and 1550, and a projection gate 1560 may be mounted inside a housing 1502. A light pattern generator 1566 may be contained within the projection gate 1560. A projection lens group 1570 may be mounted in a front surface of the housing 1502. The projection lens group 1570 may project an image of the projection gate 1560 and the light pattern generator 1566 on distant projection surface 1580.

While the projection lens group 1570 and the negative relay lens group 1510 are each shown as a single lens, it will be understood that in other embodiments of the invention either or both of these groups may include a plurality of lenses. In still other embodiments of the invention, the negative relay lens group 1510 may comprise a plurality of lenses (or lenslets) arranged in an array. In such an embodiment, the lenslets may be arranged to optically couple a lenslet with each light source in the light source array 1520. Similarly, while the positive relay lens group 1530 is shown having two lenses, in other embodiments of the invention the group may include one lens or more than two lenses.

While the light pattern generator 1566 is shown in the projection gate 1560, other embodiments of the invention may not include a light pattern generator. In such embodiments, the projection lens group 1570 projects an image of only the projection gate 1560 on the projection surface 1580. It will be understood that the light pattern generator 1566 may comprise a sheet of material with a pattern of holes, a clear substrate with a pattern of opaque or reflective material, a photographic slide, a motion picture film, or a spatial light modulator (such as a digital mirror device or liquid crystal device) without departing from the scope of the invention.

As described with regard to FIG. 8, the negative relay lens group 1510 and the positive relay lens group 1530 may be designed to produce an image 1590 of the light source array 1520 within or beyond the projection optical system of the projector 1500, in a volume that is not imaged by the projection lens group 1570. In the embodiment of the invention shown in FIG. 15, the image 1590 is disposed outside the housing 1502, in a position that is not proximate to the projection surface 1580.

In the projector 1500, the light source array 1520, having a plurality of differently colored light sources arranged in a pattern, illuminates the projection gate 1560 via the negative relay lens group 1510 and the positive relay lens group 1530. Because the image 1590 of the light source array 1520 is disposed away from the projection gate 1560, the light illuminating the projection gate 1560 has no pattern and is evenly colored. As a result, the image of the projection gate 1560 and the light pattern generator 1566 projected by the projection lens group 1570 is evenly colored and does not show the pattern of the light source array 1520.

Figure 16:
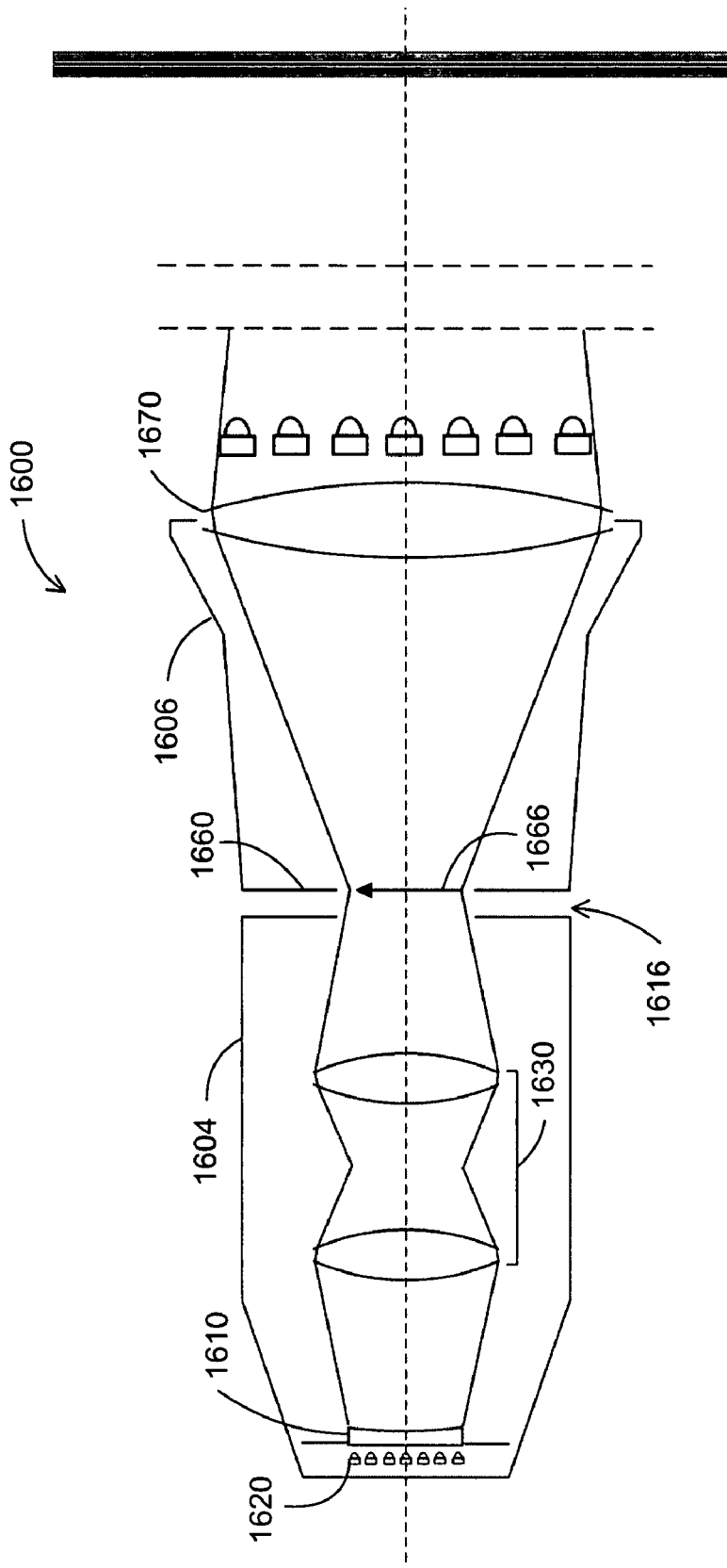
FIG. 16 is a second projector embodying the present invention including a light source array.

FIG. 16 is a second projector 1600 embodying the present invention. The projector 1600 includes two housings: a lamp housing 1604 and a projector housing 1606 separated by a gap 1616. A light source array 1620, a negative relay lens group 1610 and a positive relay lens group 1630 may be located inside the lamp housing 1604. A projection gate 1660, a light pattern generator 1666 and a projection lens group 1670 may be located in or on the surface of the projector housing 1606. The light source array 1620 in the lamp housing 1604 illuminates the projection gate 1660 in the projector housing 1606 across the gap 1616.

Projectors used in movie theaters often have a separate lamp housing and projector housing. In such a projector, an existing lamp housing may be replaced with the lamp housing 1604 to increase light output of the projector and reduce heat in the projection room.

Figure 17:
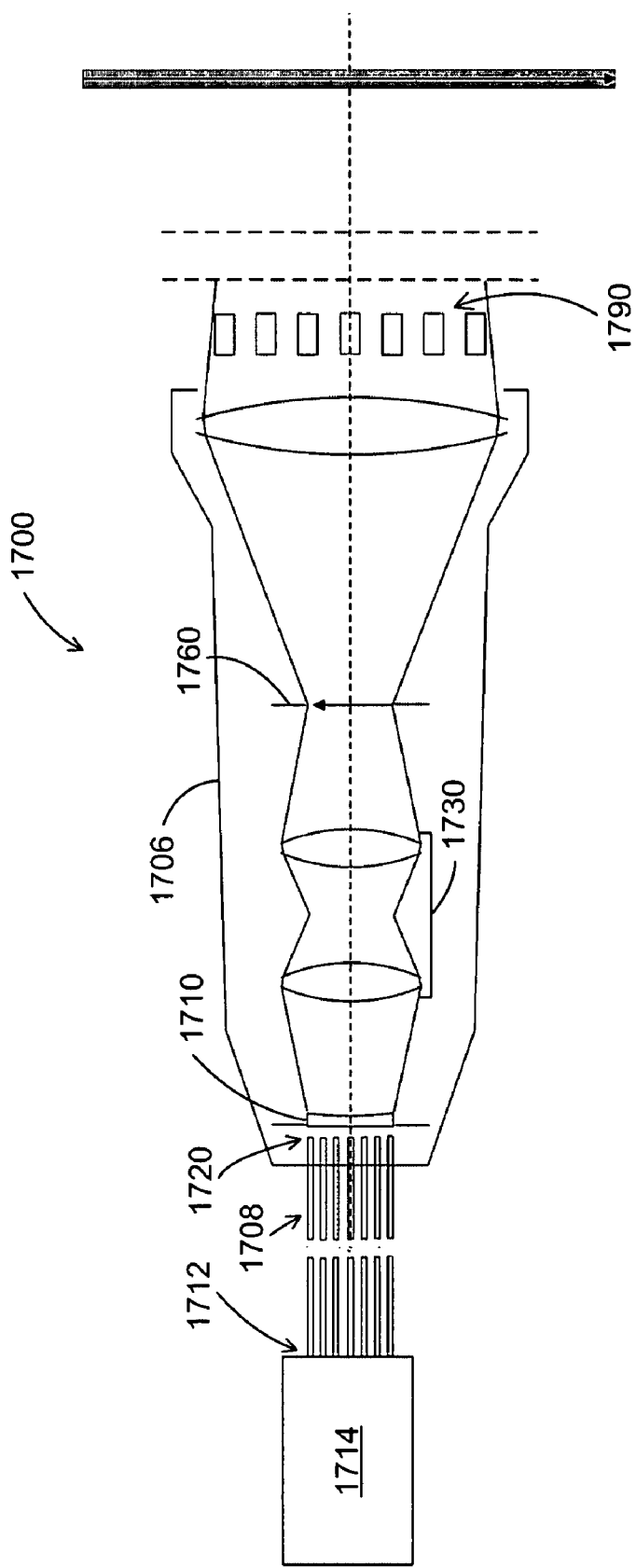
FIG. 17 is a third projector embodying the present invention including a light source array.

FIG. 17 is a third projector 1700 embodying the present invention including a light source array 1720. The light source array 1720 comprises output ends of optical fiber bundle 1708. The optical fibers in the bundle 1708 also have input ends 1712 optically coupled to an illumination source 1714. An optical fiber transmits a large percentage of light that enters its input end to its output end by the process of total internal reflection. Transmitted light emerges from the output end of the fiber with a characteristic angle of divergence. As such, the output ends of the optical fiber bundle 1708 form an array of light sources that comprise light source array 1720. The gap shown in optical fiber bundle 1708 indicates that the illumination source 1714 may be located at any distance from the projector 1700.

The illumination source 1714 may 'pump' white light into the input ends 1712 of all the optical fibers in the bundle 1708. In another embodiment of the invention, the bundle 1708 may be divided into three sub-bundles and the optical fibers in the sub-bundles pumped with red, green and blue light, respectively. In such an embodiment, the relative intensities of the red, green and blue light may be adjusted to achieve a desired color in the blended light illuminating a projection gate 1760 in the projector 1700. In yet another embodiment of the invention, the bundle 1708 may be divided into more that three sub-bundles and more than three colors may be combined in the light source array 1720 to obtain a full spectrum white beam of light.

As described with regard to FIGS. 8 and 15, the relay lens group comprising negative relay lens group 1710 and positive relay lens group 1730 may be designed to produce an image 1790 of the light source array 1720 within or beyond the projection optical system of the projector 1700, in a volume that is not imaged by the projection lens group 1770.

Figure 18:
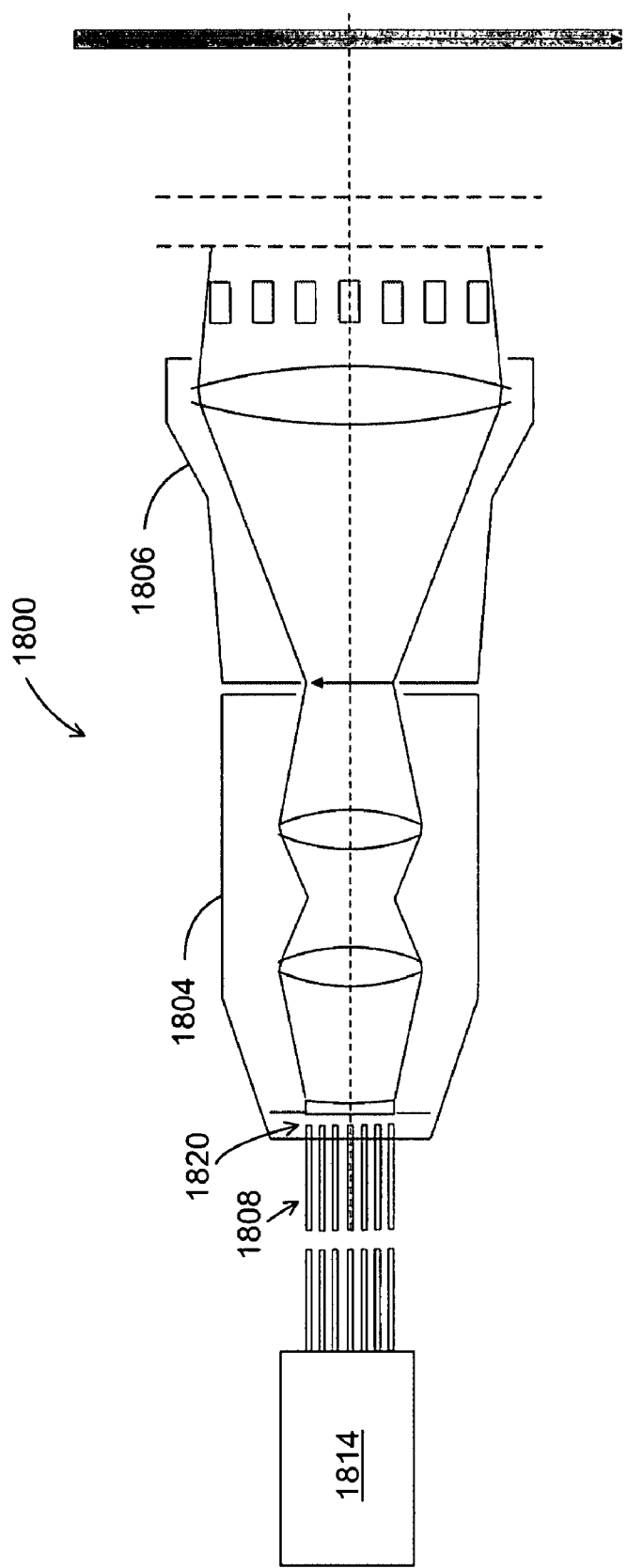
FIG. 18 is a fourth projector embodying the present invention including a light source array.

FIG. 18 is a fourth projector 1800 embodying the present invention. Projector 1800 has a configuration similar to that of projector 160, comprising a lamp housing 1804 and a projector housing 1806. However, the light source array 1820 comprises output ends of optical fibers of bundle 1808, whose input ends are pumped by an illumination source 1814.

While FIGS. 15-18 show embodiments of the present invention employing light sources arrays comprising LEDs and optical fibers, it will be understood that an array of other types of light sources may be used without departing from the scope of the invention. Other embodiments of the invention may employ an array of electrodeless plasma lamps or dielectric waveguide integrated plasma lamps. Still other embodiments may have an array comprising light sources of differing types.

Figure 19:
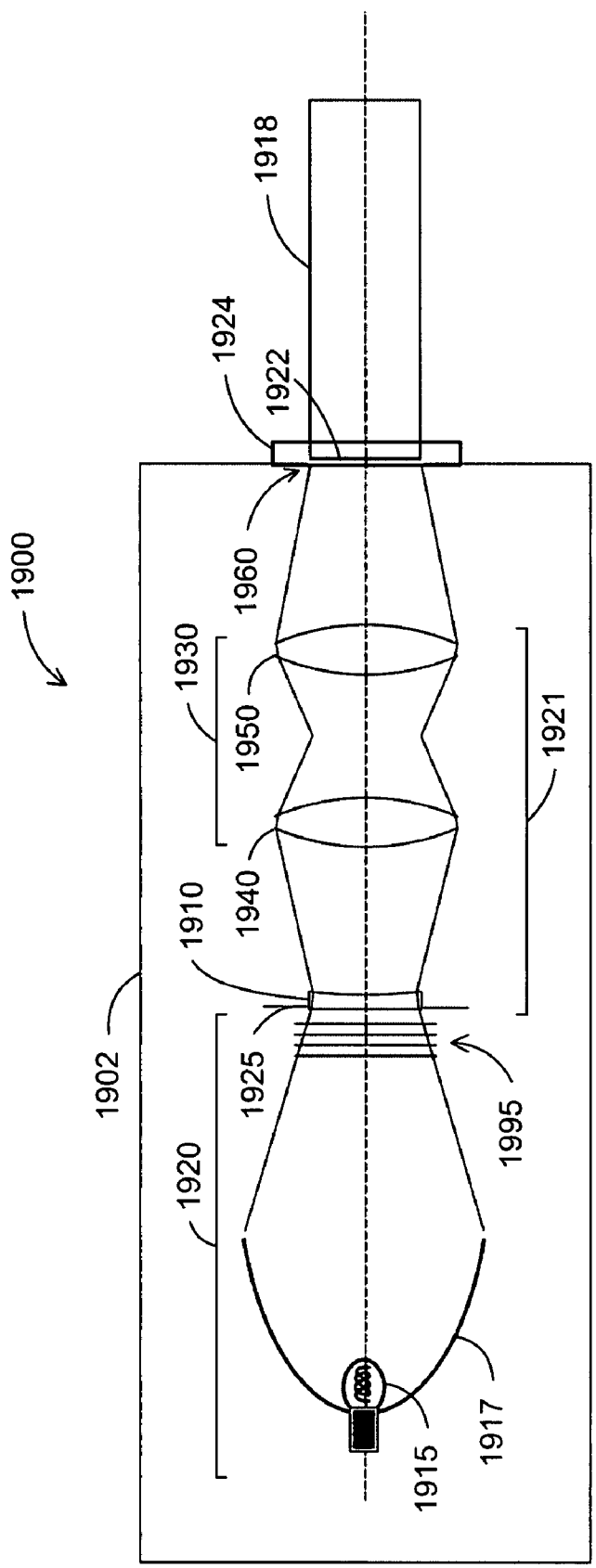
FIG. 19 is an optical system embodying the present invention for coupling a light source to a bundle of optical fibers.

FIG. 19 is an optical system 1900 embodying the present invention for coupling a light source 1920 to a bundle of optical fibers 1918. Such an optical system may be used as illumination source 1714 or 1814. Such an optical system may also be used to pump a bundle of optical fibers for use in an architectural lighting application or in theatrical or entertainment lighting special effects devices.

The optical system 1900 includes a housing 1902. Within the housing 1902 is a light source 1920 comprising a lamp 1915 and a concave reflector 1917 and a patterned color and dimming apparatus 1995. The optical system 1900 may also include a first field stop 1925. The patterned color and dimming apparatus 1995 may be located in a volume contiguous to the first field stop 1925. A positive relay lens group 1930 may include a first positive lens 1940 and a second positive lens 1950. The optical system 1900 may also include a negative relay lens group 1910. Together the positive relay lens group 1930 and the negative relay lens group 1910 comprise the relay lens group 1921. The optical system 1900 may also include a second field stop 1960.

Coincident with the second field stop 1960 is a connector 1924 that optically couples the plurality (or bundle) of optical fibers 1918 to the optical system 1900. The connector 1924 may also serve to physically couple the bundle 1918 to the housing 1902.

While the input ends 1922 are shown substantially coplanar with the second field stop 1960 in FIG. 19, it will be understood that the input ends 1922 may be positioned a short distance inside or outside the second field stop 1960 without departing from the scope of the invention. Furthermore, it will also be understood that, without departing from the scope of the invention, the input ends 1922 may be optically coupled to the optical system 1900 by a quartz rod, relay lens or other apparatus to guide the light from the second field stop 1960 to the input ends 1922 of the bundle 1918.

As described with regard to FIGS. 8-10, the relay lens group 1920 may operate to form an image of the patterned color and dimming apparatus 1995 at a location away from the second field stop 1960. As a result, the light illuminating the input ends 1922 of the optical fiber bundle 1918 does not exhibit the pattern of the color and dimming apparatus 1995. Because the light is evenly colored and dimmed, all fibers in the bundle 1918 are illuminated with light of the same color and intensity.

It will be understood that in other embodiments of the present invention a light source array may be used in the optical system 1900. As described with regard to FIGS. 15-18, such a light source array may be located at the first field stop 1925. Such a light source array in other embodiments may comprise a plurality of light emitting diodes, a plurality of electrodeless lamps, output ends of another plurality of optical fibers, or a plurality of other light sources.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

Although specific embodiments of the present invention are disclosed, these are not to be construed as limiting the scope of the present invention. Many variants of the invention will become apparent to those skilled in the art in light of this specification. The scope of the invention is only limited by the claims appended hereto.

What is claimed is:

1. A projection optical system, comprising:
   a light source array;
   a projection gate;
   a projection lens configured to project an image of the projection gate, wherein the projection gate is located between the light source array and the projection lens; and
   a relay lens group located between the light source array and the projection gate, wherein
      the relay lens group is configured to relay an image of a field stop location,
      the light source array is located in a volume contiguous to the field stop location, and
      the relay lens group is configured to prevent the projection lens from projecting an image of the light source array.

2. The projection optical system of claim 1, wherein the field stop location comprises a field stop and the light source array is located in a volume contiguous to the field stop.

3. The projection optical system of claim 1, wherein the light source array comprises a substantially planar array of light sources.

4. The projection optical system of claim 1, wherein the light source array comprises one of a plurality of light emitting diodes, a plurality of electrodeless lamps, and output ends of a plurality of optical fibers.

5. The projection optical system of claim 1, wherein the relay lens group forms an image of the light source array, the image of the light source array being disposed away from the projection gate.

6. The projection optical system of claim 1, wherein the relay lens group comprises:
a first lens group with negative optical power; and
a second lens group with positive optical power.

7. A projector, comprising:
a housing;
a light source array inside the housing;
a projection gate;
a projection lens configured to project an image of the projection gate, wherein the projection gate is located between the light source and the projection lens; and
a relay lens group inside the housing, the relay lens group located between the light source array and the projection gate, wherein
the relay lens group is configured to relay an image of a field stop location,
the light source array is located in a volume contiguous to the field stop location, and
the relay lens group is configured to prevent the projection lens from projecting an image of the light source array.

8. The projector of claim 7, wherein the projection gate is inside the housing.

9. The projector of claim 8, wherein the projection lens is inside the housing.

10. The projector of claim 7, wherein the light source array comprises a substantially planar array of light sources.

11. The projector of claim 7, wherein the light source array comprises one of a plurality of light emitting diodes, a plurality of electrodeless lamps, and output ends of a plurality of optical fibers.

12. The projector of claim 7, wherein the light source array comprises output ends of a plurality of optical fibers, the projector further comprising a source of illumination outside the housing coupled to input ends of the plurality of optical fibers.

13. The projection optical system of claim 7, wherein the relay lens group forms an image of the light source array, the image of the light source array being disposed away from the projection gate.

14. The projection optical system of claim 7, wherein the relay lens group comprises:
a first lens group with negative optical power; and
a second lens group with positive optical power.

15. A method, comprising:
positioning a light source array to illuminate a projection gate;
configuring a projection lens to project an image of the projection gate, wherein the projection gate is located between the light source array and the projection lens; and
configuring a relay lens group located between the light source array and the projection gate to:
relay an image of a field stop location, wherein the light source array is located in a volume contiguous to the field stop location, and
prevent the projection lens from projecting an image of the light source array.

16. The method of claim 15, further comprising positioning a field stop at the field stop location, wherein positioning a light source array further comprises positioning the light source array in a volume contiguous to the field stop.

17. The method of claim 15, wherein positioning a light source array further comprises positioning light sources in a substantially planar array.

18. The method of claim 17, wherein the light source array comprises output ends of a plurality of optical fibers and the method further comprises coupling a source of illumination to input ends of the plurality of optical fibers.

19. The method of claim 15, wherein the light source array comprises one of a plurality of light emitting diodes, output ends of a plurality of optical fibers, and a plurality of electrodeless lamps.

20. The method of claim 15, wherein configuring a relay lens group further comprises configuring the relay lens group to form an image of the light source array, the image of the light source array being disposed away from the projection gate.

21. The method of claim 15, wherein the relay lens group comprises:
a first lens group with negative optical power; and
a second lens group with positive optical power.

22. A lamp housing for use with a projector housing comprising a projection lens projecting an image of a projection gate, the lamp housing comprising:
a light source array; and
a relay lens group located between the light source array and the projection gate, wherein
the relay lens group is configured to relay an image of a field stop location,
the light source array is located in a volume contiguous to the field stop location, and
the relay lens group is configured to prevent the projection lens from projecting an image of the light source array.

23. The lamp housing of claim 22, wherein the light source array comprises a substantially planar array of light sources.

24. The lamp housing of claim 22, wherein the light source array comprises one of a plurality of electrodeless lamps, a plurality of light emitting diodes and output ends of a plurality of optical fibers.

25. The lamp housing of claim 22, wherein the light source array comprises output ends of a plurality of optical fibers and the lamp housing further comprises a source of illumination outside the housing coupled to input ends of the plurality of optical fibers.

26. An optical system, comprising:
a light source configured to project a beam of light;
a filter apparatus configured to selectively move at least one variable density filter across the beam of light;
a coupling; and
a relay lens group located between the light source and the coupling, wherein
the relay lens group is configured to relay an image of a field stop location,
the filter apparatus is located in a volume contiguous to the field stop location, and
the relay lens group is configured to prevent an image of the filter apparatus from being formed at input ends of a plurality of optical fibers positioned in the coupling.

27. An illumination source for a plurality of optical fibers, comprising a housing, the housing comprising:
a coupling;
a light source configured to project a beam of light;
a filter apparatus configured to selectively move at least one variable density filter across the beam of light; and
a relay lens group located between the light source and the coupling, wherein
the relay lens group is configured to relay an image of a field stop location,
the filter apparatus is located in a volume contiguous to the field stop location, and the relay lens group is configured to prevent an image of the filter apparatus from being formed at input ends of a plurality of optical fibers positioned in the coupling.

28. A method, comprising:

providing a light source configured to project a beam of light;

providing a filter apparatus configured to selectively move at least one variable density filter across the beam of light; and configuring a relay lens group between the light source and a coupling, wherein the relay lens group is configured to:

relay an image of a field stop location, wherein the filter apparatus is located in a volume contiguous to the field stop location, and prevent an image of the filter apparatus from being formed at input ends of a plurality of optical fibers located in the coupling.

* * * * *